United States Patent
Lei et al.

(10) Patent No.: US 9,491,466 B2
(45) Date of Patent: Nov. 8, 2016

(54) VIDEO CODING APPARATUS AND METHOD

(71) Applicant: FUJITSU LIMITED, Kawasaki-shi, Kanagawa (JP)

(72) Inventors: Xuying Lei, Kawasaki (JP); Hidenobu Miyoshi, Kawasaki (JP); Satoshi Shimada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 447 days.

(21) Appl. No.: 14/187,995

(22) Filed: Feb. 24, 2014

(65) Prior Publication Data
US 2014/0286422 A1    Sep. 25, 2014

(30) Foreign Application Priority Data
Mar. 22, 2013  (JP) ................................ 2013-060865

(51) Int. Cl.
| | | |
|---|---|---|
| G06K 9/36 | (2006.01) | |
| H04N 19/11 | (2014.01) | |
| H04N 19/593 | (2014.01) | |
| H04N 19/176 | (2014.01) | |
| H04N 19/147 | (2014.01) | |

(52) U.S. Cl.
CPC ............ H04N 19/11 (2014.11); H04N 19/147 (2014.11); H04N 19/176 (2014.11); H04N 19/593 (2014.11)

(58) Field of Classification Search
CPC .................................................. H04N 19/593
USPC ...................................................... 375/240.16
See application file for complete search history.

(56) References Cited

U.S. PATENT DOCUMENTS

| | | | | |
|---|---|---|---|---|
| 7,116,830 | B2* | 10/2006 | Srinivasan | ........... H04N 19/136 375/E7.125 |
| 7,369,707 | B2* | 5/2008 | Sakaguchi | ........... H04N 19/176 375/E7.129 |
| 7,792,188 | B2* | 9/2010 | Tong | ...................... H04N 19/00 375/240 |
| 2009/0060045 | A1 | 3/2009 | Tateno | |
| 2013/0058411 | A1* | 3/2013 | Xu | ....................... H04N 19/105 375/240.12 |

FOREIGN PATENT DOCUMENTS

| | | |
|---|---|---|
| JP | 2009-55542 | 3/2009 |
| JP | 2012-34391 | 2/2012 |

OTHER PUBLICATIONS

Google scholar search history.pdf.*

(Continued)

*Primary Examiner* — William C Vaughn, Jr.
*Assistant Examiner* — Luis Perez Fuentes
(74) *Attorney, Agent, or Firm* — Fujitsu Patent Center

(57) ABSTRACT

A video coding apparatus includes a processor that executes a procedure. The procedure includes: (c) classifying each of a plurality of groups into either a full evaluation group or into a partial evaluation group; (d) determining the prediction mode to use as generating the predicted image of a coding target block by evaluating coding costs of all the prediction modes belonging to each of the groups for a group classified at (c) into the full evaluation group, and evaluating coding costs of a portion of prediction modes out of the prediction modes belonging to each of the groups for a group classified at (c) into the partial evaluation group; and (e) generating a predicted image of the coding target block using the prediction mode determined at (d).

18 Claims, 31 Drawing Sheets

(56) References Cited

OTHER PUBLICATIONS

Bross, Benjamin et al. "High efficiency video coding (HEVC) text specification draft 6", Joint Collaborative Team on Video Coding (JCT-VC) of ITU-T SG16 WP3 and ISO/IEC JTC1/SC29/WG11, 7th Meeting: Geneva, CH, Nov. 21-30, 2011. [Please refer to sections 8.4 Decoding process for coding units coded in intra prediction mode and section 8.4.3.1 Intra sample prediction].

\* cited by examiner

FIG.5
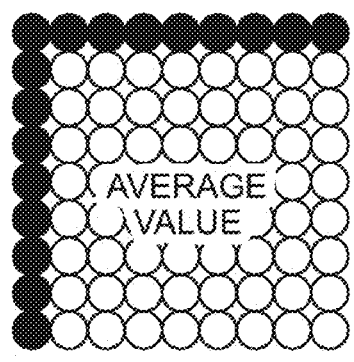
AVERAGING PREDICTION
(PREDICTION MODE 1)
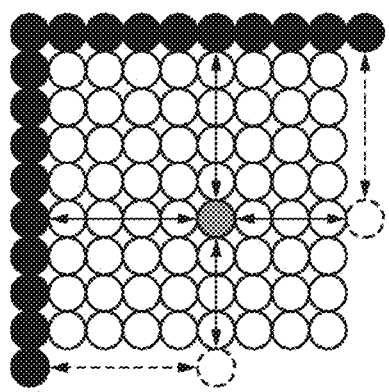
FLAT PLANE PREDICTION
(PREDICTION MODE 0)
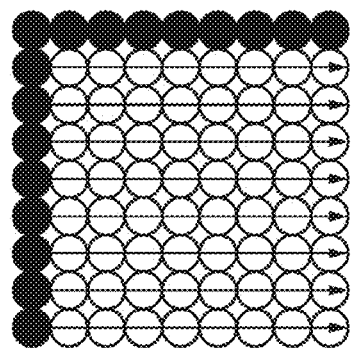
HORIZONTAL PREDICTION
(PREDICTION MODE 10)
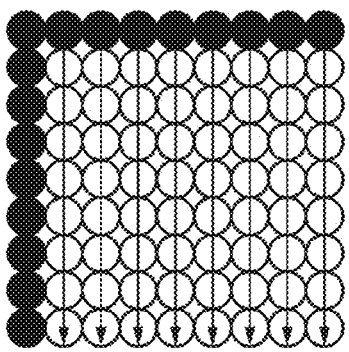
VERTICAL PREDICTION
(PREDICTION MODE 26)

FIG.15

| GROUP | PREDICTION MODE | PERIPHERAL BLOCKS |
|---|---|---|
| 1 | 2 TO 9 | A, B |
| 2 | 10 TO 26 | B, C, D |
| 3 | 27 TO 34 | D, E |

VIDEO CODING APPARATUS AND METHOD

CROSS-REFERENCE TO RELATED APPLICATION

This application is based upon and claims the benefit of priority of the prior Japanese Patent Application No. 2013-060865, filed on Mar. 22, 2013, the entire contents of which are incorporated herein by reference.

FIELD

The embodiments discussed herein are related to a video coding apparatus and method.

BACKGROUND

Video images are configured from successive still images, and there is generally a need to code video images in video image transmission due to the large data volume. Coding video images is coding processing that converts one video image data stream into another data stream, and is called compression processing that compresses the video image data volume. Due to enabling the compression of large data volume video images, video coding technology has become indispensable in terrestrial digital broadcasting, Blu-ray (registered trademark), and for transmitting and recording movies with digital cameras. H.264/AVC is an example of a typical video coding method standard. High Efficiency Video Coding (HEVC) is also planned to become a standard as a next generation video coding technology, and has a coding efficiency that is two times that of H.264/AVC or greater.

Note that known video coding methods include inter prediction coding methods (also referred to as inter-frame prediction coding methods) and intra prediction coding methods (also referred to as in-frame prediction coding methods).

Inter prediction coding methods utilize a high correlation (high degree of similarity) of video images in the time direction, and perform coding of frame images of coding targets by comparing a decoded image decoded from an already coded frame image, in order to remove redundancy.

Intra prediction coding methods utilize a high correlation of video image in the spatial direction, and code a frame image of a coding target using only data within the coding target frame image, and without employing other frame images. Specifically, a predicted image is generated of a coding target block contained in a frame image by using reference pixels at peripheral blocks to the coding target block, and a difference between the predicted image and an original image is coded.

There is a need to select a prediction mode for use when generating a predicted image to improve the coding efficiency using an intra prediction coding method. A predicted image generated using the optimal prediction mode has a small difference to the original image and good coding efficiency. For example, when coding a luma signal using the HEVC method that is planned to become a standard, an optimal prediction mode is selected from 35 types of prediction mode as illustrated in FIG. 4, and the predicted image is generated.

Up to now, in order to select the optimal prediction mode, predicted images are generated for prediction mode determination from reference pixels of peripheral blocks of the coding target block for all of the prediction modes, and coding costs thereof are computed. Then, the prediction mode with the minimum coding cost is selected as the optimal prediction mode by comparison of all the coding costs. The computation and comparison of coding cost is referred to below as coding cost evaluation.

[Related Non-Patent Documents]
High efficiency video coding (HEVC) text specification draft 6, Joint Collaborative Team on Video Coding (JCT-VC) of ITU-T SG16 WP3 and ISO/IEC JTC1/SC29/WG11, 7th Meeting: Geneva, CH, 21-30 Nov., 2011.

SUMMARY

According to an aspect of the embodiments, a video coding apparatus includes: a processor; and a memory storing instructions, which when executed by the processor perform a procedure. The procedure includes: (a) determining whether or not a peripheral block of a coding target block, which is an object of coding using an intra prediction coding method, is referenceable when generating a predicted image of the coding target block; (b) generating pixel values of reference pixels included in peripheral blocks determined at (a) to be non-referenceable, based on a determination result of (a) and pixel values of a reference pixels included in a peripheral block determined at (a) to be referenceable; (c) for each of a plurality of groups arising when a plurality of prediction modes are classified in the plurality of groups such that prediction modes with similar prediction directions are classified into the same group, classifying each of the plurality of groups into either a full evaluation group in which a coding cost is evaluated for all prediction modes or a partial evaluation group in which coding costs are evaluated for a part of the prediction modes, based on peripheral block data that represents peripheral blocks containing each of the reference pixels employed when generating the predicted image using one or more prediction modes belonging to individual groups, and the determination result of (a) or a degree of similarity between reference pixels contained in peripheral blocks represented by the peripheral block data or any combination thereof; (d) determining the prediction mode for use when generating the predicted image of the coding target block by evaluating a coding cost of all the prediction modes belonging to each of the groups for a group classified at (c) in the full evaluation group, and evaluating coding costs of a portion of prediction modes out of the prediction modes belonging to each of the groups for a group classified at (c) in the partial evaluation group; and (e) generating a predicted image of the coding target block using the prediction mode determined at (d).

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a schematic explanatory diagram illustrating respective prediction image generating methods of each prediction mode for prediction modes 0, 1, 10 and 26 in a HEVC method;

FIG. 15 is a table summarizing peripheral block data of each group;

DESCRIPTION OF EMBODIMENTS

Detailed explanation follows regarding a video coding apparatus that codes a video image as an exemplary embodiment of technology disclosed herein, with reference to the drawings.

First explanation follows regarding an outline of video coding processing of a video coding apparatus according to the present exemplary embodiment. Intra prediction coding processing is performed by High Efficiency Video Coding (HEVC) in the video coding apparatus according to the present exemplary embodiment.

Figures 1, 2:
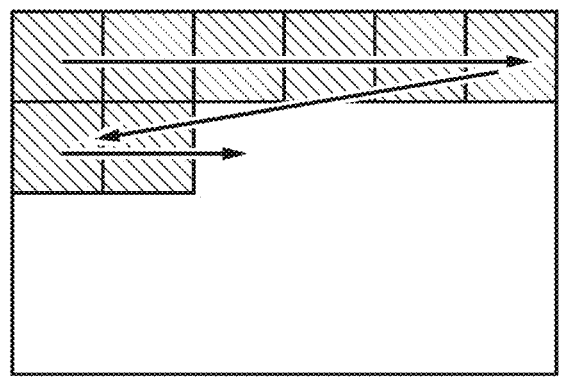
FIG. 1 is an explanatory diagram illustrating a sequence of a coding processing within a single screen.
FIG. 2 is an explanatory diagram illustrating a sequence of a coding processing within one block when coding processing is performed such that one block has been partitioned into plural blocks.

Single frame images (also called single screens) are partitioned into plural blocks, and the video intra prediction coding is performed to each block. The coding within each single frame image is, as illustrated by the arrow in FIG. 1, performed in sequence from the left to the right, and from top to bottom. It is possible to partition each block into even smaller blocks, and to perform coding on each of the partitioned blocks. FIG. 2 illustrates a specific example of a partitioned image and the processing sequence when each of the blocks illustrated in FIG. 1 is further partitioned into plural smaller blocks. An appropriate block size is selected during coding from out of plural block sizes.

In the intra prediction coding, coding performed by utilizing the property that pixel values of adjacent blocks are similar to each other. Specifically, pixels included in peripheral blocks of the coding target block are employed to generate a predicted image of the coding target block, and a difference image representing the difference between the predicted image and the original image is coded. Note that pixels for reference (for use) in generating the predicted image mean reference pixels.

Figure 3:
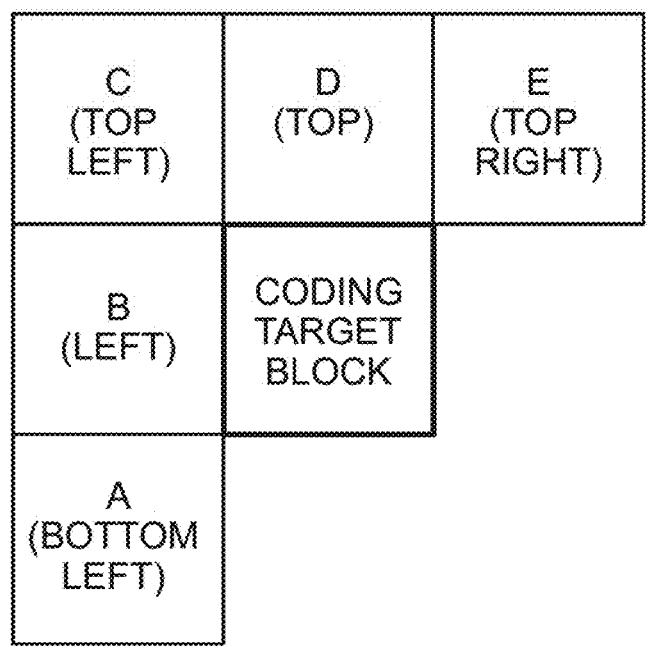
FIG. 3 is an explanatory diagram illustrating placement of peripheral blocks of a coding target block.
Figure 4:
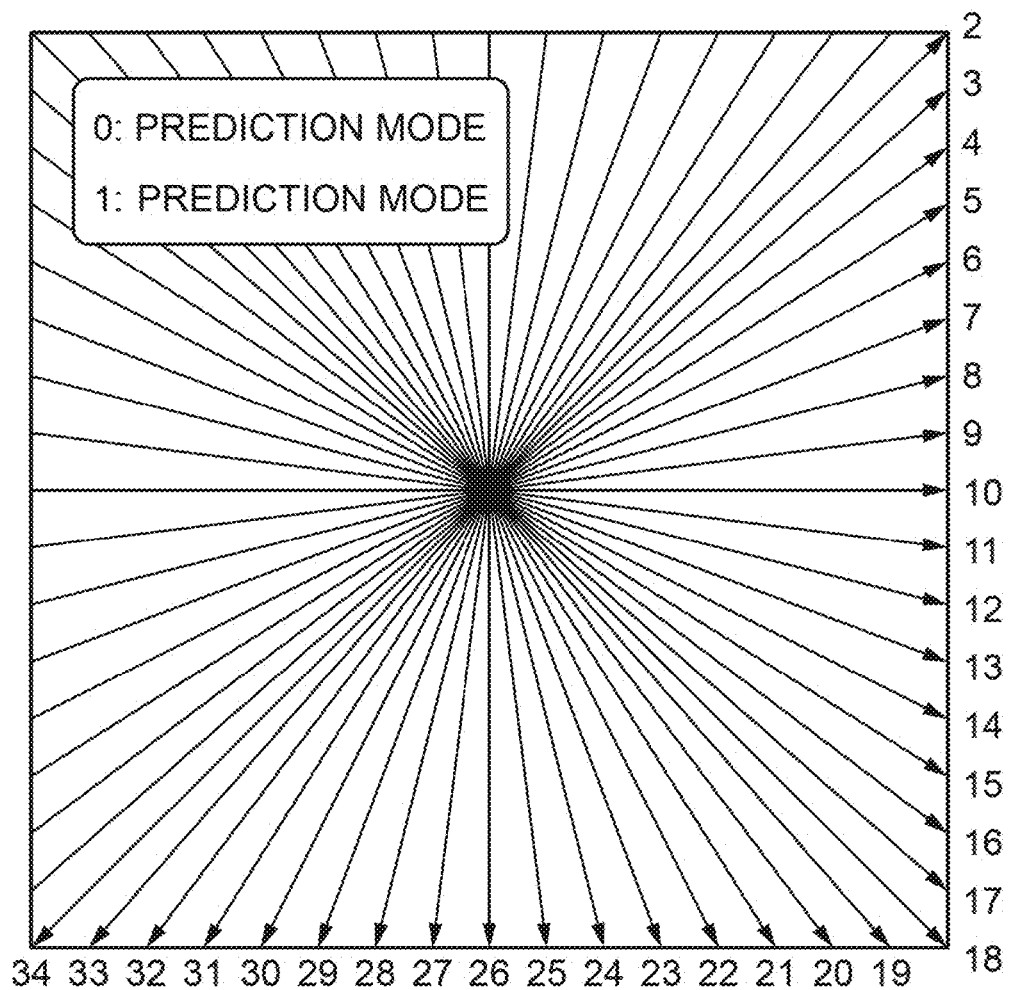
FIG. 4 is a schematic diagram of 35 types of predication modes prepared in a HEVC method.

In the HEVC method, as illustrated in FIG. 3, the reference pixels are employed of 5 peripheral blocks with respect to the coding target block, at the bottom left (A), the left (B), the top left (C), the top (D) and the top right (E), to generate a predicted image that predicts the image of the coding target block. The size of the peripheral blocks depends on the size of the coding target block. In intra prediction coding processing, there are various types of intra prediction mode when predicting the predicted image (referred to below simply as prediction modes), and there are 35 types of prediction mode prepared for coding the luma signal in the HEVC method (see also FIG. 4).

A characteristic prediction direction is pre-associated with the 33 types of prediction mode of mode number 2 to mode number 34, other than the prediction mode with mode number 0 (planar prediction), and the prediction mode with mode number 1 (DC prediction). The arrows in FIG. 4 indicate the prediction directions of each of the prediction modes from mode number 2 to mode number 34.

FIG. 5 is an explanatory diagram to schematically explain a predicted image generation method of each of the prediction modes of the prediction mode 0, the prediction mode 1, the prediction mode 10 and the prediction mode 26, out of the 35 types of prediction mode. For example, in the prediction mode 1 at the top left of FIG. 5 (DC prediction), the 3 peripheral blocks have adjacent at the left, top left and top of the coding target block, and an average value of each of the reference pixels adjacent to the coding target block is derived, and taken as each of the pixel values of the predicted image of the coding target block. Moreover, in the prediction mode 10 illustrated at the bottom left of FIG. 5 (horizontal prediction), the pixel values of each of the reference pixels contained in the peripheral block adjacent on the left hand side of the coding target block are copied in the horizontal direction into the adjacent coding target block, and the pixel values of the coding target block are predicted. Detailed explanation is omitted for other prediction modes, however out of the prediction modes in which the prediction direction is determined, in the prediction modes other than those with horizontal or vertical prediction, a predicted image is generated by taking weighted average values of plural reference pixels according to the prediction direction instead of simply copying reference pixels.

Explanation next follows regarding an example of a configuration of the video coding apparatus according to the present exemplary embodiment.

Figure 6:
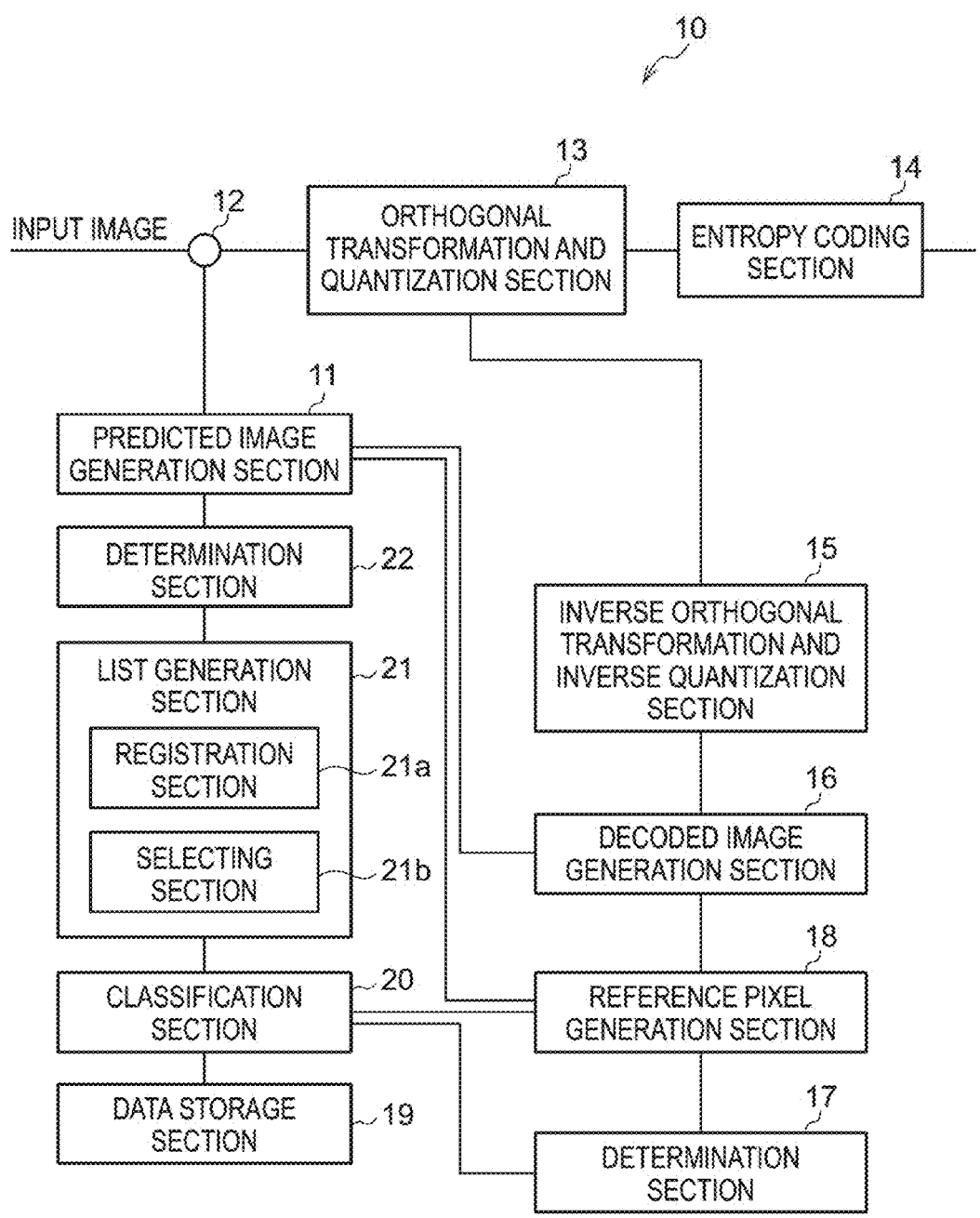
FIG. 6 is a schematic diagram of a video coding apparatus according to an exemplary embodiment.

FIG. 6 illustrates a video coding apparatus 10 according to the present exemplary embodiment. The video coding apparatus 10 includes a predicted image generation section 11, a difference image generation section 12, an orthogonal transformation and quantization section 13 and an entropy coding section 14. The video coding apparatus 10 also includes an inverse orthogonal transformation and inverse quantization section 15, a decoded image generation section 16, a determination section 17, a reference pixel generation section 18, a data storage section 19, a classification section 20, a list generation section 21 and a determination section 22. The list generation section 21 includes a registration section 21a and a selecting section 21b. Note that in the present exemplary embodiment diagrams and explanations relating to the function for inter prediction coding are omitted.

The predicted image generation section 11 employs the prediction mode determined by the determination section 22 to generate a predicted image for the coding target block, and to output the predicted image to the difference image generation section 12.

The difference image generation section 12 generates a difference image representing the difference between the predicted image generated by the predicted image generation section 11 and the input original image (referred to below as the input image), and then outputs the difference image to the orthogonal transformation and quantization section 13.

The orthogonal transformation and quantization section 13 first performs orthogonal transformation processing on the difference image input from the difference image generation section 12. The orthogonal transformation and quantization section 13 then performs quantization on the frequency signal obtained by the orthogonal transformation processing, and outputs a quantization signal to the entropy coding section 14 and the inverse orthogonal transformation and inverse quantization section 15.

The entropy coding section 14 entropy codes (variable length codes) and output streams the quantization signal input. The data representing the prediction mode when generating the predicted image of the coding target block is also entropy coded and output streamed. Entropy coding means a coding method in which a variable length code is allocated according to a symbol appearance frequency.

The inverse orthogonal transformation and inverse quantization section 15 inverse quantizes the input quantization signal, and then after also performing inverse orthogonal transformation, outputs the resulting signal to the decoded image generation section 16. A signal corresponding to the difference image prior to coding is obtained by the inverse quantization and inverse orthogonal transformation. The signal obtained by the inverse orthogonal transformation and inverse quantization section 15 and corresponding to the difference image prior to coding is called a reproduction difference image.

The decoded image generation section 16 generates a decoded image of the current coding target block by adding together the predicted image input from the predicted image generation section 11 and the reproduction difference image input from the inverse orthogonal transformation and inverse quantization section 15, and outputs the decoded image to the reference pixel generation section 18.

Based on positional data of the peripheral blocks to the coding target block, the determination section 17 determines whether or not are referenceable for peripheral blocks of the coding target block when generating the predicted image of the coding target block. The determination result of the determination section 17 is output to the reference pixel generation section 18 and the classification section 20.

Based on result of whether or not is referenceable in the determination section 17, and based on the pixel values of the reference pixels included in the decoded image of peripheral blocks determined by the determination section 17 to be referencable, the reference pixel generation section 18 generates pixel values for each of the reference pixels are referenced to generate the predicted image of the coding target block. The reference pixel generation section 18 outputs pixel values of generated reference pixels to the classification section 20 and the predicted image generation section 11.

The data storage section 19 stores peripheral block data for each of plural groups when plural prediction modes are classified into plural groups based on the prediction direction. The peripheral block data represents the peripheral blocks that include each of the reference pixels to be employed when the predicted image is generated by employing the prediction mode belonging to the individual group. The peripheral block data stored in the data storage section 19 is read by the classification section 20 and then employed in classification processing, described later.

The classification section 20 classifies each of the plural groups referred to above into either a full evaluation group or a partial evaluation group. The groups classified as full evaluation groups are groups in which the coding costs for all the prediction modes belonging to each group are evaluated. The groups classified as partial evaluation groups are groups in which the coding cost for some (one in the present exemplary embodiment) of the prediction modes is evaluated, out of the prediction modes belonging to the partial evaluation group. The classification section 20 performs classification based on peripheral block data of the data storage section 19, and the determination result of the determination section 17 a degree of similarity between reference pixels included in the peripheral blocks indicated by the peripheral block data, or any combination thereof. The classification result of the classification section 20 is output to the list generation section 21.

Herein, evaluation of coding cost means computing and comparing the coding costs of plural prediction modes to determine the optimal prediction mode when generating the predicted image of the coding target block from out of plural prediction modes.

The list generation section 21 includes the registration section 21a and the selecting section 21b, and based on the classification results of the classification section 20, the list generation section 21 registers a prediction mode for evaluating coding cost in a candidate mode list, to generate the candidate mode list.

More specifically, for groups classified as full evaluation groups, the registration section 21a of the list generation section 21 registers all the prediction modes belonging to the group in the candidate mode list. The selecting section 21b of the list generation section 21 selects a representative mode from prediction modes belonging to the groups classified as partial evaluation groups. For groups classified as partial evaluation groups, the registration section 21a of the list generation section 21 registers the representative mode selected by the selecting section 21b in the candidate mode list.

The determination section 22 evaluates the coding cost of each of the prediction modes registered in the candidate mode list generated by the list generation section 21, and determines the optimum prediction mode for generating the predicted image of the coding target block.

Figure 7:
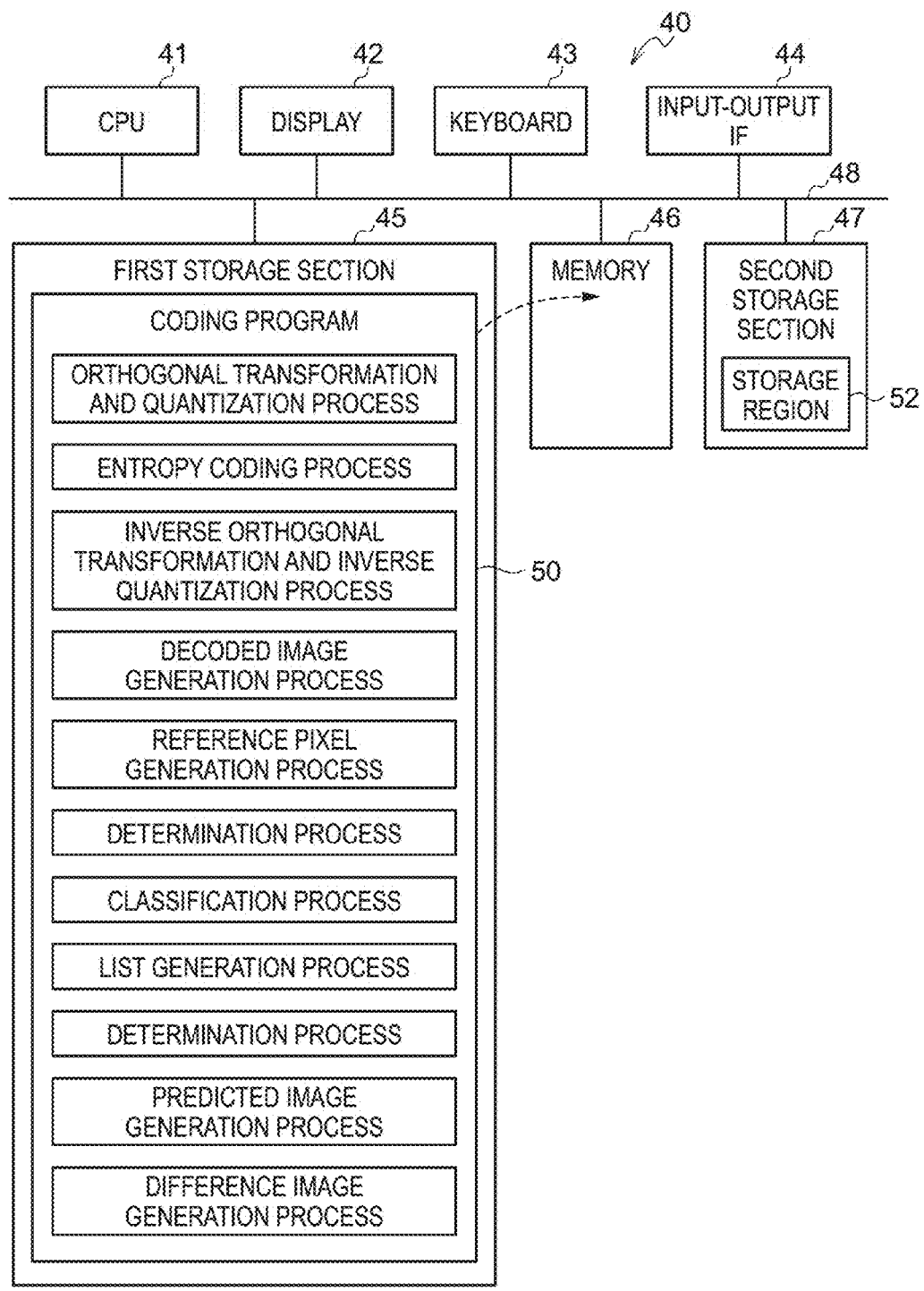
FIG. 7 is a configuration block diagram of a computer functioning as a video coding apparatus.

In the present exemplary embodiment, the video coding apparatus 10 may be implemented by a computer 40, for example as illustrated in FIG. 7. The computer 40 includes a Central Processing Unit (CPU) 41, a display 42, a keyboard 43, an input-output interface (IF) 44, a first storage section 45, a memory 46 and a second storage section 47. The CPU 41, the display 42, the keyboard 43, the input-output IF 44, the first storage section 45, the memory 46 and the second storage section 47 are connected together through a bus 48.

The first storage section 45 is a non-volatile storage section. A coding program 50 is stored in the first storage section 45.

The coding program 50 includes a predicted image generation process, a difference image generation process, a orthogonal transformation and quantization process and an entropy coding process. The coding program 50 also includes an inverse orthogonal transformation and inverse quantization process, a decoded image generation process, a determination process, a reference pixel generation process, a classification process, a list generation process and a determination process.

The CPU 41 reads the coding program 50 from the first storage section 45, expands the coding program 50 in the memory 46, and executes each of the processes of the coding program 50. The CPU 41 operates as the predicted image generation section 11 illustrated in FIG. 6 by executing the predicted image generation process. The CPU 41 operates as the difference image generation section 12 illustrated in FIG. 6 by executing the difference image generation process. The CPU 41 operates as the orthogonal transformation and quantization section 13 illustrated in FIG. 6 by executing the orthogonal transformation and quantization process. The CPU 41 operates as the entropy coding section 14 illustrated in FIG. 6 by executing the entropy coding process. The CPU 41 operates as the inverse orthogonal transformation and inverse quantization section 15 illustrated in FIG. 6 by executing the inverse orthogonal transformation and inverse quantization process. The CPU 41 operates as the decoded image generation section 16 illustrated in FIG. 6 by executing the decoded image generation process. The CPU 41 operates as the determination section 17 illustrated in FIG. 6 by executing the determination process. The CPU 41 operates as the reference pixel generation section 18 illustrated in FIG. 6 by executing the reference pixel generation process. The CPU 41 operates as the classification section 20 illustrated in FIG. 6 by executing the classification process. The CPU 41 operates as the list generation section 21 illustrated in FIG. 6 by executing the list generation process. The CPU 41 operates as the determination section 22 illustrated in FIG. 6 by executing the determination process. The computer 40 executing the coding program 50 accordingly functions as the video coding apparatus 10.

A storage region 52 corresponding to the data storage section 19 is provided in the second storage section 47, and peripheral block data is generated in advance and stored therein.

The input-output IF 44 is an input-output interface such as a recording medium. The recording medium may, for example, employ a CD-ROM or a DVD-ROM, or flash memory connected through a Universal Serial Bus (USB), enabling generated coding data and the like to be stored thereon. Moreover, video image data may be acquired from the recording medium. The input-output IF 44 may also be an interface connectable to an imaging device that captures a video, and may be communication interface such as a network.

Explanation next follows regarding operation of the video coding apparatus 10.

First explanation follows regarding peripheral block data stored in the data storage section 19. The peripheral block data is generated in advance and stored on the data storage section 19. Note that a generation function for generating the peripheral block data may be provided internally to the video coding apparatus 10, or may be provided externally thereto.

Explanation next follows regarding a peripheral block data generation method. In a HEVC method such as mentioned above, there are 35 types of prediction mode prepared as prediction modes for intra prediction. A prediction direction is determined for the 33 types of prediction mode other than the prediction mode with the prediction mode number 0 (planar prediction), and the prediction mode with mode number 1 (DC prediction). In the present exemplary embodiment, the 33 types prediction modes other than the prediction mode 0 and the prediction mode 1 are classified into plural groups such that prediction modes with similar prediction directions are classified into the same groups.

Moreover, for each of the prediction modes, the peripheral blocks are determined for use in generating a predicted image of the coding target block. Prediction modes with similar prediction directions are used the same peripheral blocks or peripheral blocks in the vicinity to generate the predicted image. Thus the coding cost computed, for prediction modes with similar prediction directions is projected to be closer than for prediction modes that have completely different prediction directions.

Thus in the present exemplary embodiment, prediction modes with the same peripheral blocks containing the reference pixels for reference to predict image generation are classified in the same group as similar prediction modes in advance, so as to perform classification efficiently in the classification section 20. This is performed because classifying prediction modes using reference pixels from the same peripheral blocks into the same group is projected to give closer coding costs computed, than classifying prediction modes using reference pixels from different peripheral blocks into the same group. The data represented by the peripheral blocks containing the reference pixels used to generate the predicted image using a prediction mode belonging to each of the groups is stored in the data storage section 19 for each of the groups.

Figure 8:
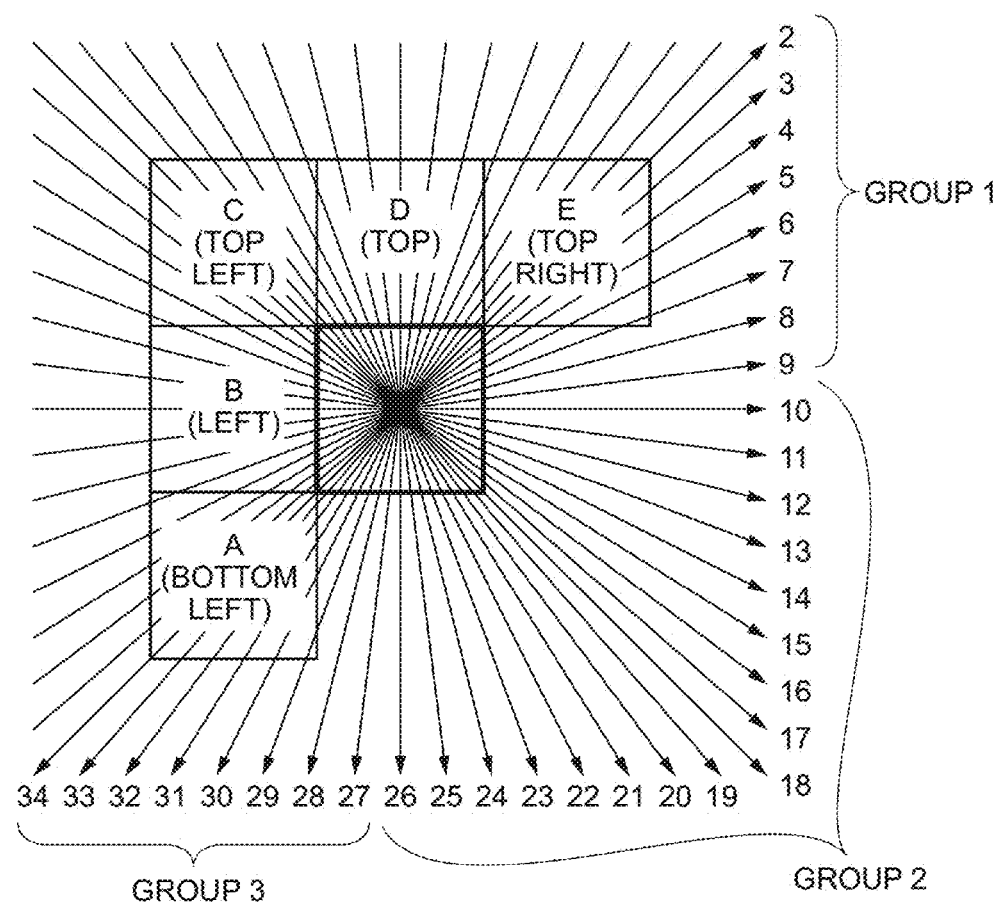
FIG. 8 is a diagram illustrating a classification state when the same prediction modes, by peripheral blocks in case of generating prediction images are classified into the same group.

For example, in the HEVC method, the 33 types of prediction modes with defined prediction directions are classified into 3 groups, group 1 to group 3 as illustrated in FIG. 8.

(1) Group 1: Prediction Mode 2 to Prediction Mode 9

Each of the prediction modes from prediction mode 2 to prediction mode 9 are classified into group 1.

Figure 9:
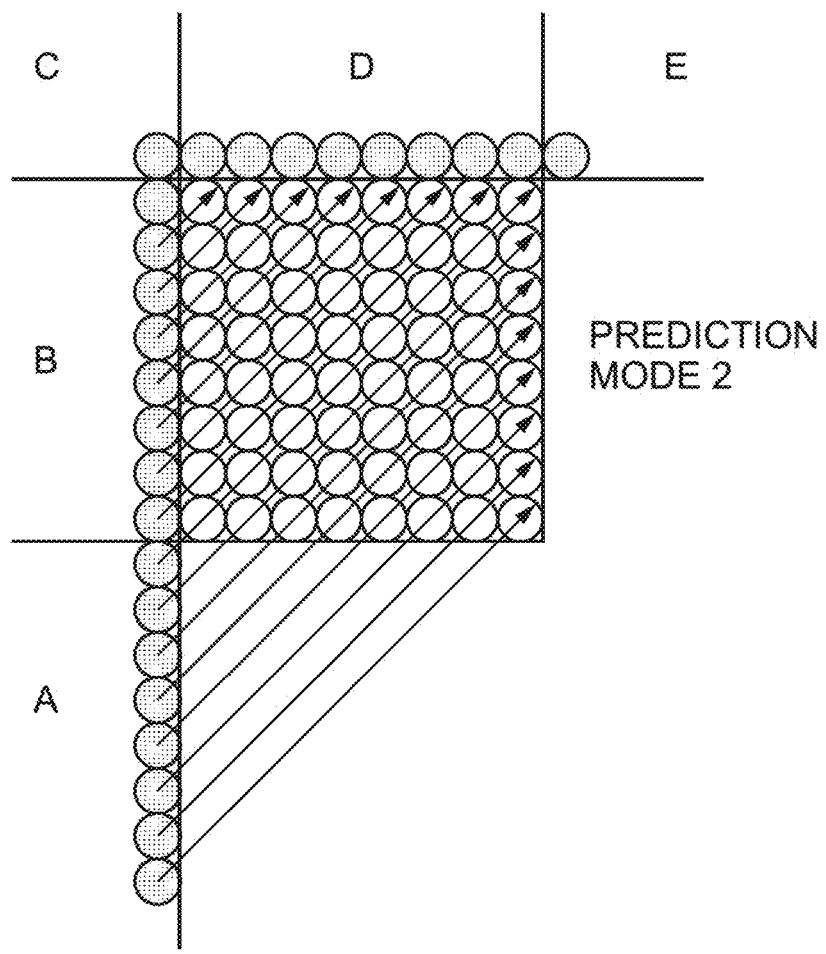
FIG. 9 is an explanatory diagram schematically illustrating a prediction method of a prediction mode 2.

As an example, FIG. 9 is an explanatory diagram for giving an outline explanation of a prediction method of the prediction mode 2. The pixels of white circular appearance are coding target block pixels, and the pixels of mesh patterned circular appearance are reference pixels (similar applies to FIG. 10 to FIG. 14).

In the prediction mode 2, each of the reference pixels that are adjacent to the coding target block contained in the peripheral blocks A, B are employed in the direction indicated by the arrows illustrated in FIG. 9 and the predicted image is generated. Similarly, in the prediction mode 3 to prediction mode 9 too, each of the reference pixels that are adjacent to the coding target block contained in the peripheral blocks A, B is employed and predicted images are generated along the respective prediction directions defined for each of the prediction modes.

Thus each of the prediction modes from prediction mode 2 to prediction mode 9 are classified as being in group 1 since the same peripheral blocks are employed to generate the predicted images.

Consequently, the coding costs evaluated for each of the prediction modes belonging to the group 1 is only related to each of the reference pixels contained in the peripheral blocks A, B adjacent to the coding target block.

(2) Group 2: Peripheral Block 10 to Peripheral Block 26

Each of the prediction modes from prediction mode 10 to prediction mode 26 are classified in group 2.

Figure 10:
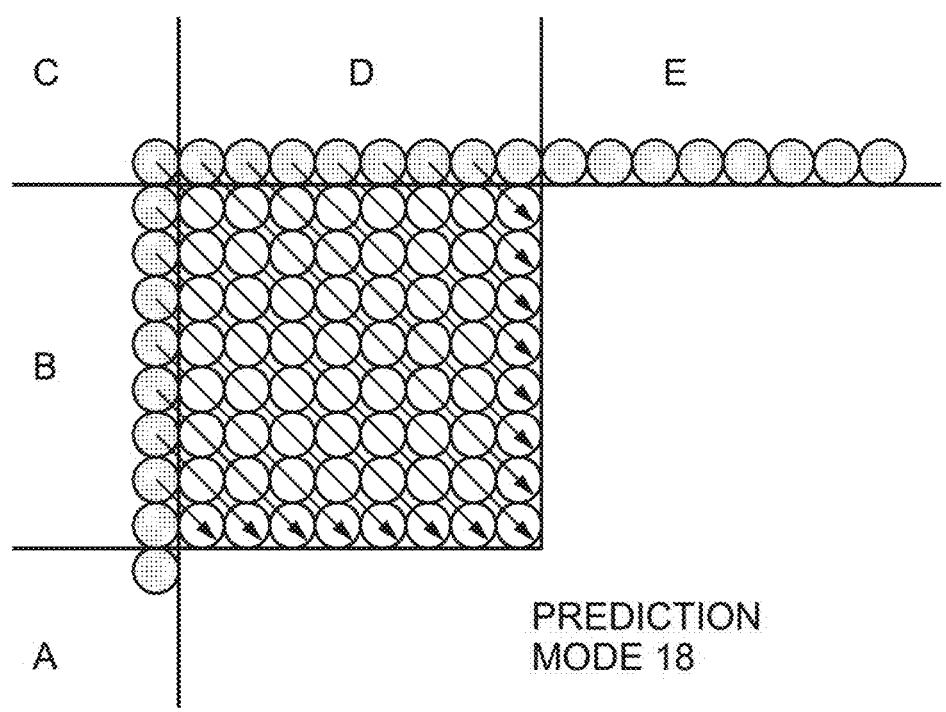
FIG. 10 is an explanatory diagram schematically illustrating a prediction a method of a prediction mode 18.

Explanation follows regarding an example of a prediction method of a prediction mode belonging to group 2. FIG. 10 is an explanatory diagram for giving an outline explanation of a prediction method of the prediction mode 18, and FIG. 11 is an explanatory diagram for giving an outline explanation of a prediction method of the prediction mode 19.

In the prediction mode 18, as illustrated in FIG. 10, each of the reference pixels contained in the peripheral blocks B, C, D adjacent to the coding target block are employed along the direction indicated by the arrows illustrated in FIG. 10 to generate the predicted image.

Figure 11:
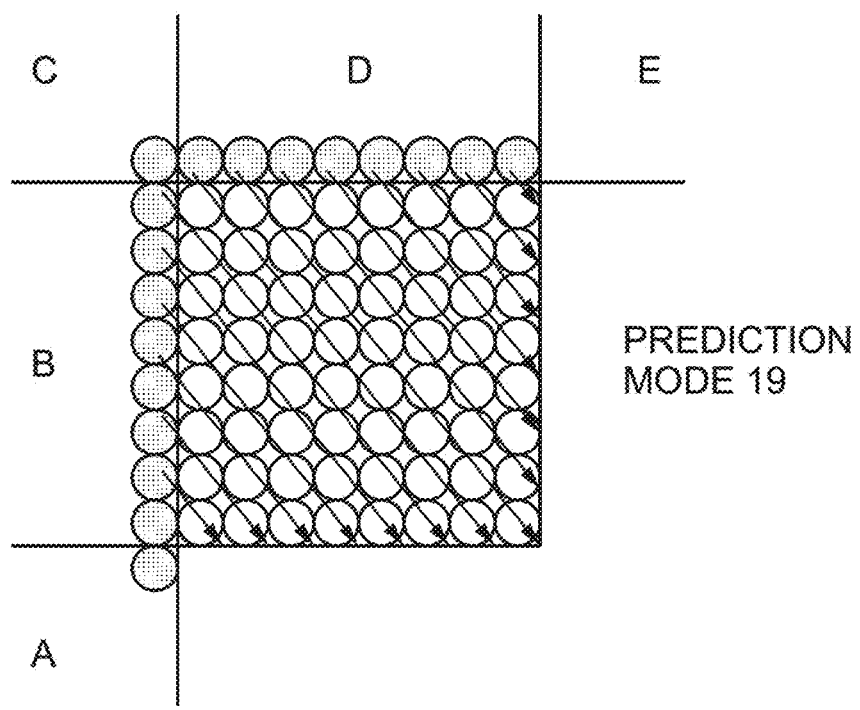
FIG. 11 is an explanatory diagram schematically illustrating a prediction method of a prediction mode 19.

In the prediction mode 19, the reference pixels are the same as in the prediction mode 18, however the predicted image is generated by using the reference pixels in the direction illustrated by the arrows in FIG. 11.

Similarly, in each of the other prediction modes of the prediction mode 11 to prediction mode 25, the reference pixels in the same peripheral blocks as the peripheral blocks containing the reference pixels used in the prediction mode 18 and 19 are employed along the prediction direction defined for each of the prediction modes to generate the respective predicted images.

Figure 12:
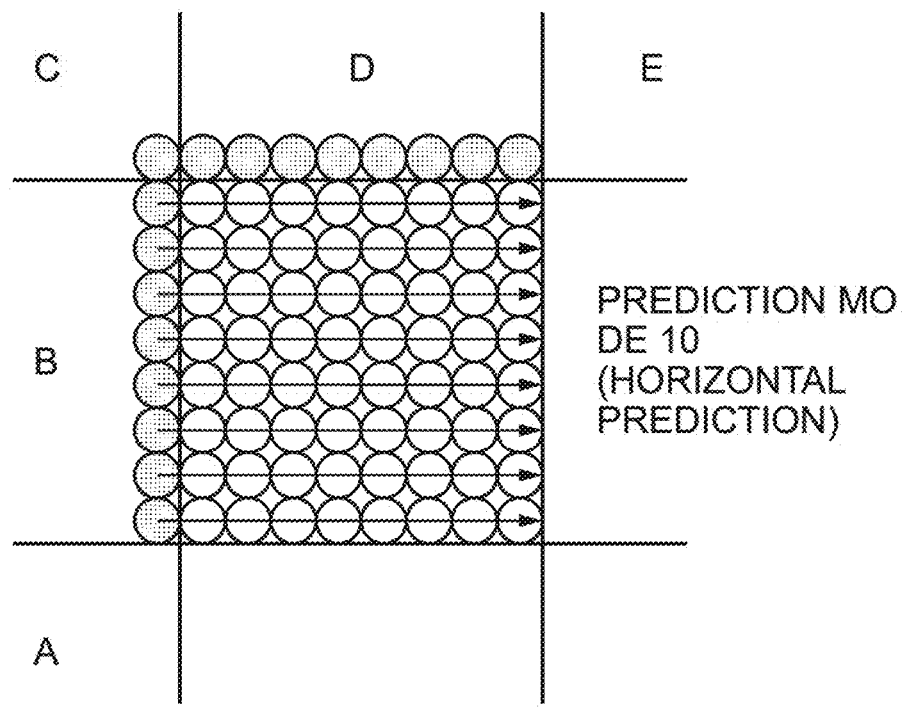
FIG. 12 is an explanatory diagram schematically illustrating a prediction method of a prediction mode 10.
Figure 13:
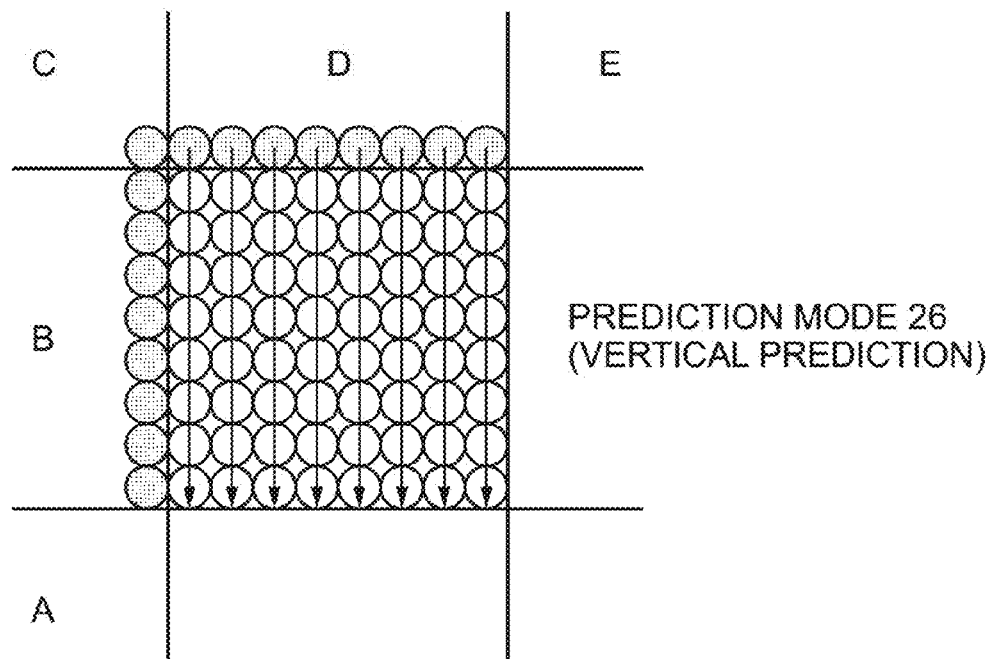
FIG. 13 is an explanatory diagram schematically illustrating a prediction method of a prediction mode 26.

Note that as illustrated in FIG. 12, in the prediction mode 10 (horizontal prediction), reference pixels only contained in the peripheral block B adjacent to the coding target block are copied in the horizontal direction to generate the predicted image. Moreover, as illustrated in FIG. 13, in the prediction mode 26 (vertical prediction), reference pixels only contained in the peripheral block D adjacent to the coding target block are copied in the vertical direction to generate the predicted image. However, in the HEVC method, when the predicted image is generated by the prediction mode 10 and 26, after copying the reference pixels as described above and generating each of the pixels, smoothing processing is performed using each of the reference pixels of the peripheral blocks B, C, D so as to generate the respective predicted images.

Thus each of the prediction modes from prediction mode 10 to prediction mode 26 are classified in group 2 since they have the same peripheral blocks employed for generating the predicted images. The coding cost computed for each of the prediction modes belonging to group 2 is only related to each of the above reference pixels contained in the peripheral blocks B, C, D.

(3) Group 3: Prediction Mode 27 to Prediction Mode 34

Each of the prediction modes from the prediction mode 27 to the prediction mode 34 are classified into group 3.

Figure 14:
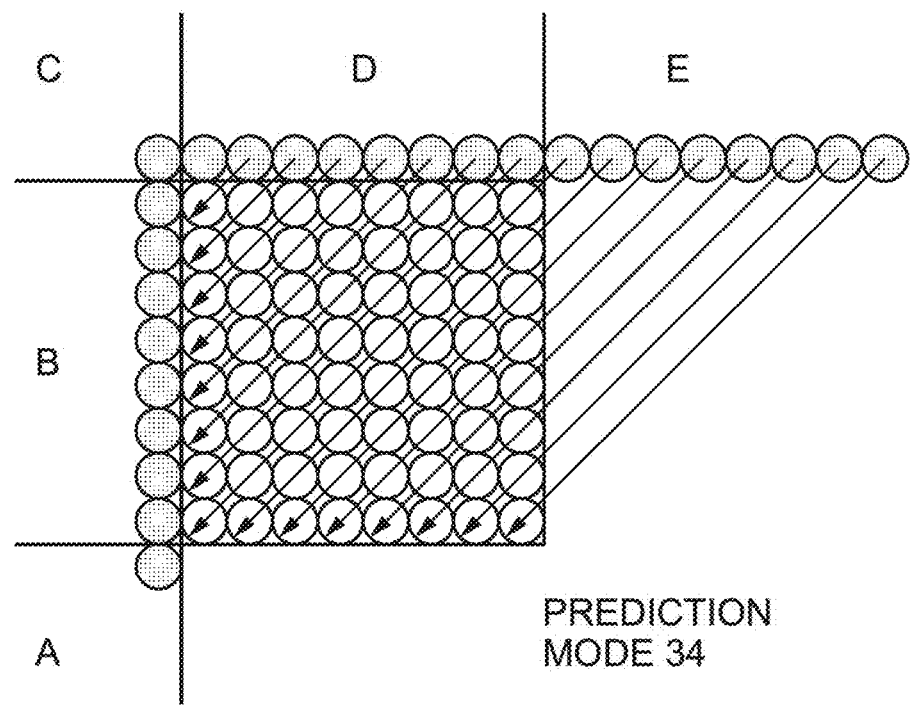
FIG. 14 is an explanatory diagram schematically illustrating a prediction method of a prediction mode 34.

As an example, FIG. 14 is an explanatory diagram for an outline explanation of a prediction method of the prediction mode 34. In the prediction mode 34, each of the reference pixels contained in the peripheral blocks D, E adjacent to the coding target block are employed along the direction illustrated by the arrows in FIG. 14 and the predicted image is generated.

Similarly, in each of the prediction modes of the prediction mode 27 to prediction mode 33, each of the reference pixels contained in the peripheral blocks D, E adjacent to the coding target block are employed along the prediction direction defined for each of the prediction modes and the respective predicted images are generated.

Each of the prediction modes of the prediction mode 27 to prediction mode 34 are classified into group 3 since the same peripheral blocks are employed to generate the respective predicted images. The computation coding cost of each of the prediction modes belonging to the group 3 is related only to the reference pixels contained in the peripheral blocks D, E that are adjacent to the coding target block.

FIG. 15 is a table summarizing the peripheral block data for each of the groups 1 to 3. Peripheral block data is associated in the table illustrated in FIG. 15, wherein identification data (A, B, C, D, E) representing peripheral blocks are associated with group numbers identifying the groups and associated with mode numbers of the prediction modes belonging to the respective groups. The peripheral block data may be stored in the data storage section 19 in the tabular format illustrated in FIG. 15.

Figure 16:
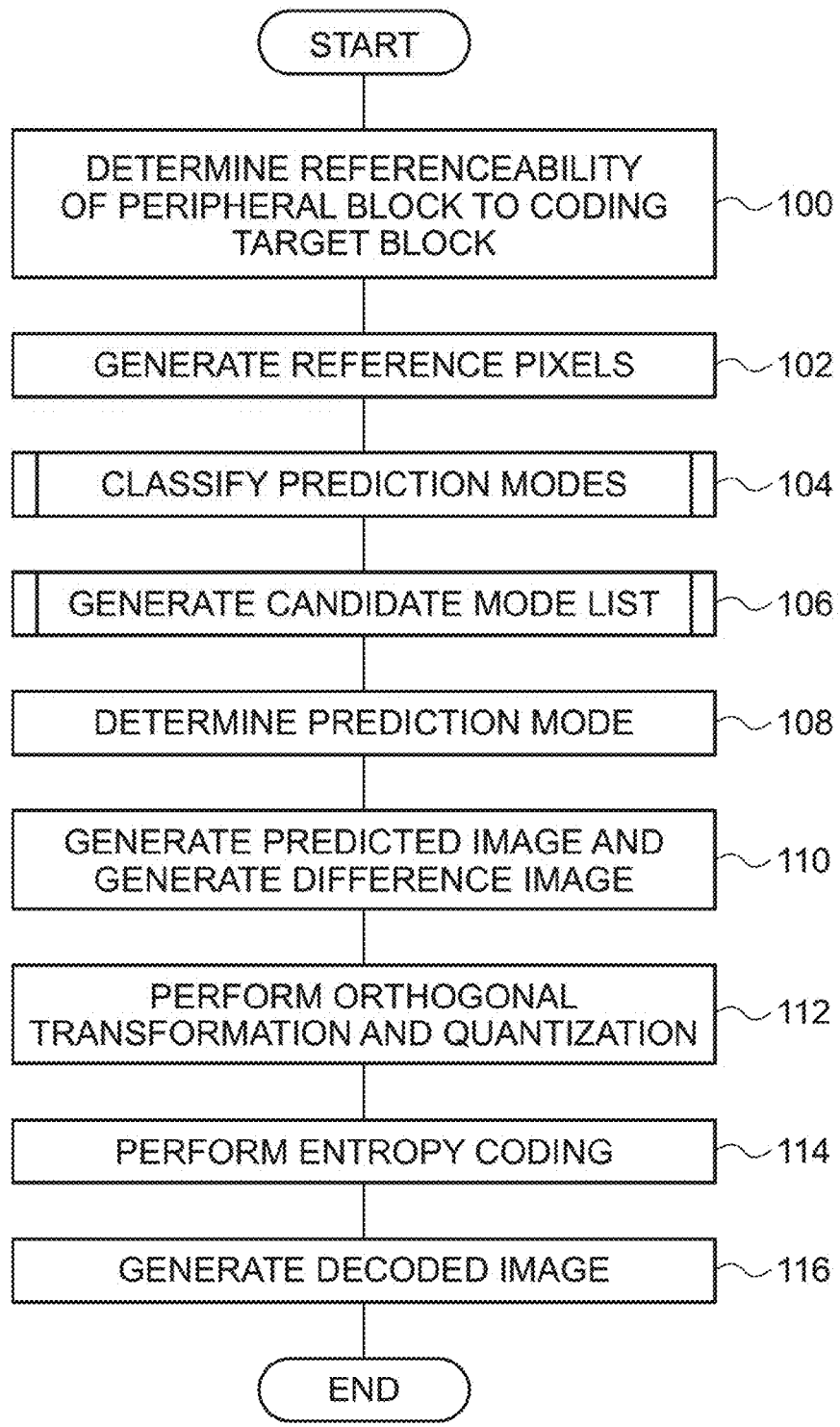
FIG. 16 is a flow chart illustrating a flow of processing of a coding program.

FIG. 16 is a flow chart illustrating a flow of processing of a coding program. Coding of the coding target blocks is executed according to the coding sequence illustrated in FIG. 1 to FIG. 2 by repeatedly executing the processing illustrated in FIG. 16, finally resulting in coding of a single frame image.

In step 100, the determination section 17 determines whether or not each of the peripheral blocks to the coding target block is referenceable when generating the predicted image of the coding target block. In the present exemplary embodiment the determination section 17 determines referenceability according to a HEVC method.

In the HEVC method, a peripheral block is determined to be referenceable when it is a block in which coding processing has already been completed, and a peripheral block is determined to be non-referenceable when it is a block that has not yet been coded, or is a block positioned outside of the screen. The size and position of peripheral blocks is ascertainable as long as the size and position of the coding target block is known, enabling determination to be made as to whether or not the peripheral block is referenceable. The determination section 17 accordingly performs determination processing based on the size and position of the coding target block.

Figure 17:
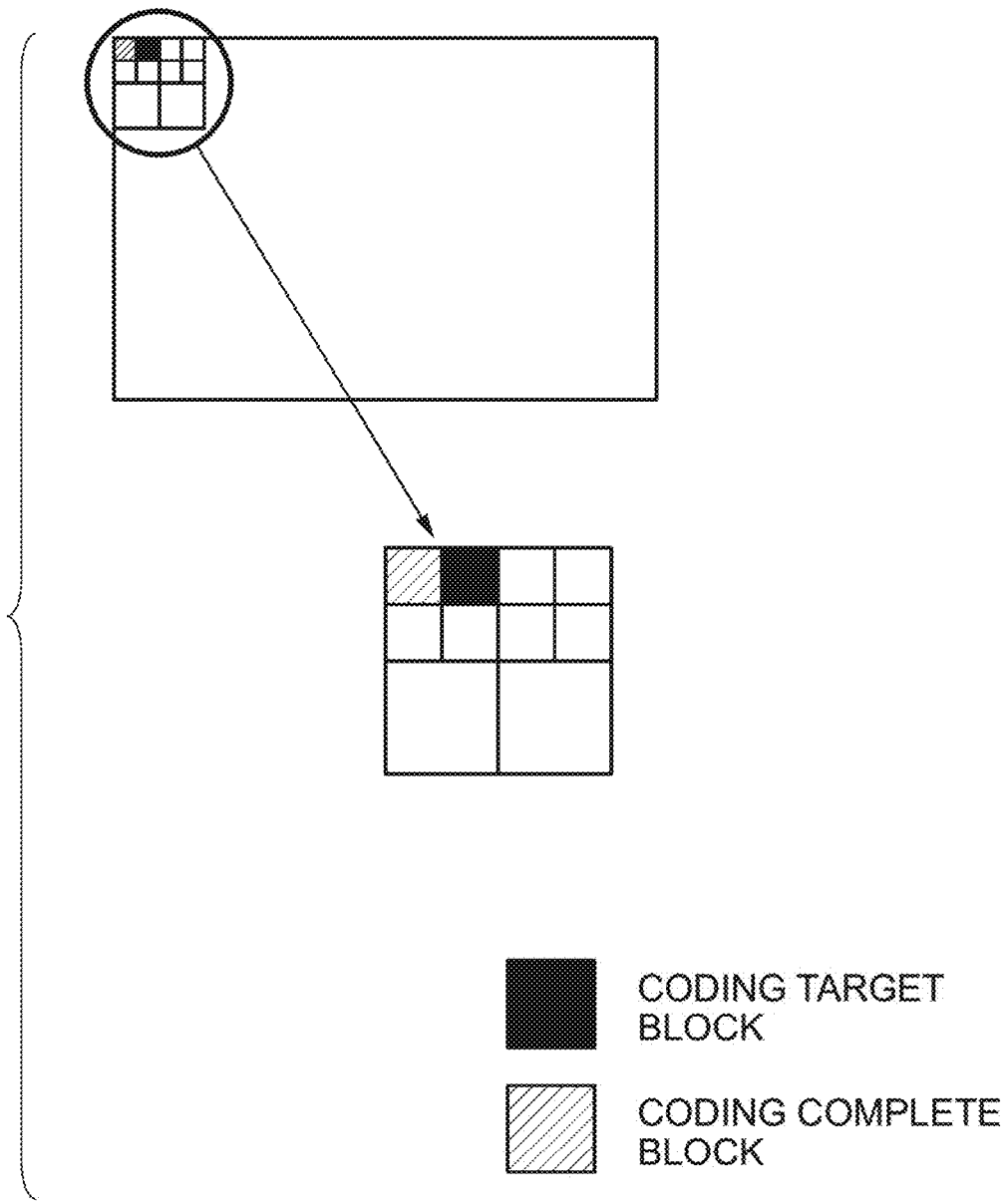
FIG. 17 is a graph illustrating an example of a coding target block.

Explanation follows regarding a specific method of peripheral block referenceability determination. As illustrated in FIG. 17, explanation follows of an example of a case in which referenceability determination is performed for a peripheral block positioned at the periphery of a coding target block. Note that the coding target block appears with solid black infill in FIG. 17. The coding target block illustrated in FIG. 17 is a block arising when a block at the top left corner portion in a single screen has been further partitioned smaller, and the top edge of the coding target block corresponds to a portion of the outside edge of the single screen. An already coded block is present adjacent at the left hand side of the coding target block. Diagonal shading is applied in FIG. 17 to a block that has been already coded at the time the predicted image of the coding target block is generated.

Figure 18:
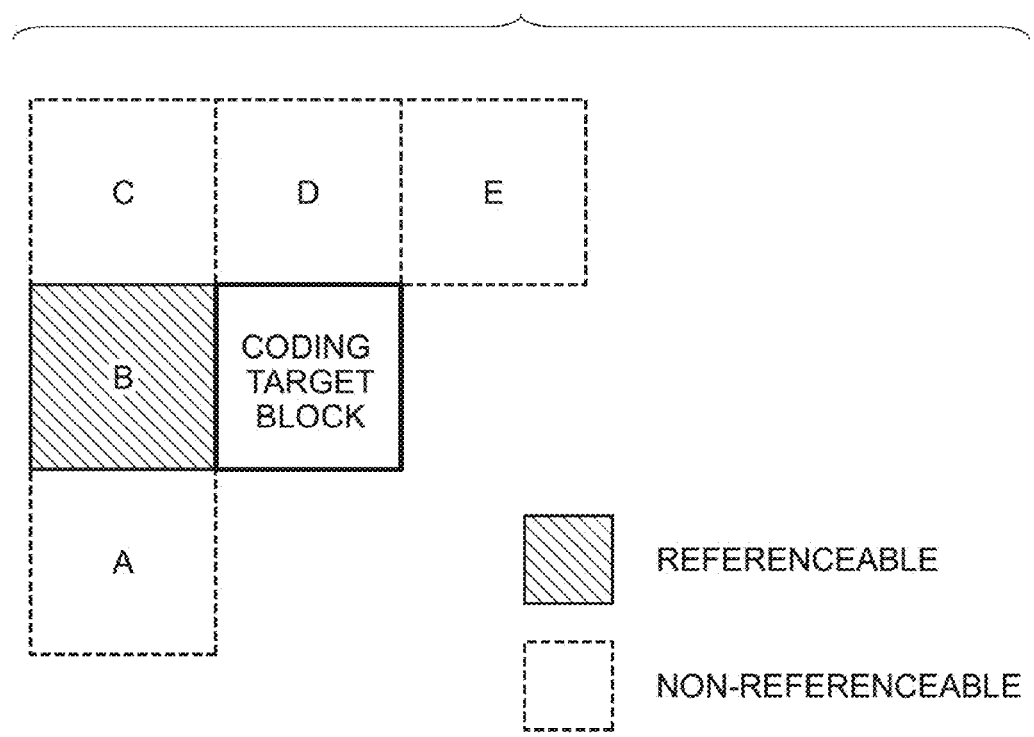
FIG. 18 is a graph illustrating an example of determination results of whether or not is referenceable for peripheral blocks.

FIG. 18 illustrates a referenceability determination result. In FIG. 18, the referenceable block is applied with diagonal shading. Non-referenceable blocks are illustrated in FIG. 18 with no diagonal shading and with intermittent lines. As illustrated in FIG. 18, the block C on the top left side of the coding target block, the block D on the top side, and the block E on the top right side are positioned outside of the screen, and so are not referenceable. The block B at the left side of the coding target block has already completed coding processing and so is referenceable. The block A at the bottom left side of the coding target block has not yet completed coding processing, and so is non-referenceable. Determination of whether or not coding processing has already been completed may be ascertained from the size and position of the coding target block and the sequence of coding predetermined by the HEVC method (see FIG. 1 and FIG. 2).

The determination section 17 outputs the determination result to the reference pixel generation section 18 and the classification section 20.

At step 102, the reference pixel generation section 18 generates pixel values of the reference pixels contained in the peripheral blocks determined to be non-referenceable by the determination section 17 based on the determination result input from the determination section 17 and on the pixel values of the reference pixels of the peripheral blocks input from the decoded image generation section 16.

The pixel values of the reference pixels of the peripheral blocks input from the decoded image generation section 16 means the pixel values of the decoded pixels decoded in the decoded image generation section 16, and so naturally are pixel values of the reference pixels contained in the peripheral blocks determined by the determination section 17 to be referenceable.

As long as a peripheral block has already been coded, there is no need to generate new pixel values of reference pixels in the peripheral block because the decoded image is generated in the decoded image generation section 16. However, new generation is required for peripheral blocks determined to be non-referenceable by the determination section 17, namely for peripheral blocks not already coded and for peripheral blocks outside the screen.

In the reference pixel generation section 18, the reference pixels of peripheral blocks determined to be non-referenceable are generated according to the rules of the HEVC method. For example, the reference pixel generation section 18 copies pixel values from the referenceable peripheral block closest to the peripheral block determined to be non-referenceable.

Explanation follows regarding a specific generation method of pixel values for the reference pixels in the example of the coding target block positioned as illustrated in FIG. 17 and FIG. 18.

Figure 19:
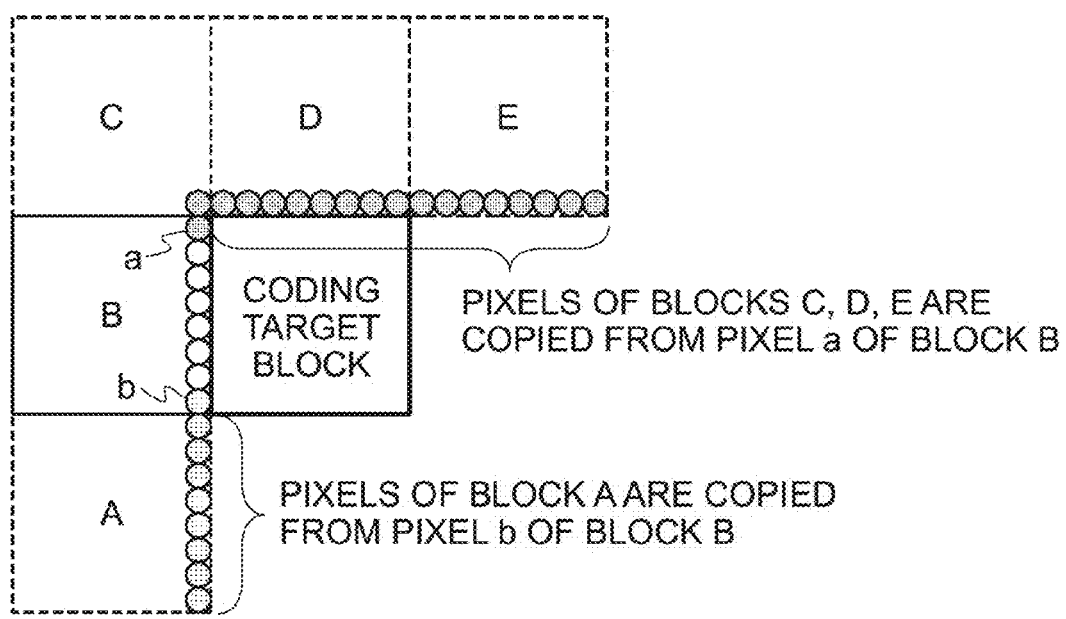
FIG. 19 is an explanatory diagram illustrating a generation method of pixel values of reference pixels.

As illustrated in FIG. 17 and FIG. 18, the peripheral block B at the left side of the coding target block is referenceable, however the peripheral blocks A, C, D, E are non-referenceable. Therefore, as illustrated in FIG. 19, the reference pixel generation section 18 uses the pixel values of the reference pixels contained in the referenceable peripheral block B to generate pixel values for the reference pixels of the other peripheral blocks.

Specifically, for the pixel values of each of the reference pixels contained in the peripheral blocks C, D, E, the reference pixel generation section 18 copies the pixel value of a reference pixel a, that is contained in the referenceable peripheral block B that is closest to the peripheral blocks C, D, E, and that is closest to the peripheral blocks C, D, E.

For the pixel values of each of the reference pixels contained in the peripheral block A, the reference pixel generation section 18 copies the pixel value of a reference pixel b, that is contained in the referenceable peripheral block B that is closest to the peripheral block A, and that is closest to the peripheral block A.

Note that when all of the 5 peripheral blocks A to E are determined to be non-referenceable then the reference pixel generation section 18, according to the rules of the HEVC method, generates each of the pixel values for the reference pixels contained in the peripheral blocks A to E by generating according to the following Equation (1). Consequently, all the reference pixels become the same value px1.

$$px1 = 1 << (\text{BitDepth} - 1) \qquad \text{Equation (1)}$$

The symbol << here indicates a shift operator, and BitDepth indicate the bit depth of the Luma signal. For example, when the Luma signal is an 8 bit signal then the BitDepth is 8. Consequently, the value of 1 shifted 7 bits to the left is px1.

Note that the pixel values of the reference pixels of the peripheral block determined to be referenceable do not need to be newly generated since they have already been generated as a decoded image in the decoded image generation section 16, and so the pixel values of the decoded image may be utilized as they are.

Incidentally, in the HEVC method smoothing processing is applied to the pixel values of each of the reference pixels of the 5 peripheral blocks A to E, irrespective of whether or not the peripheral blocks are referenceable. Consequently, after the reference pixel generation section 18 generates each of the reference pixels of the non-referenceable peripheral blocks, then applies smoothing processing to the pixel values of each of the reference pixels in the 5 peripheral blocks A to E, and then outputs the pixel values of the reference pixels to the classification section 20 and the predicted image generation section 11.

At step 104, the classification section 20 classifies, each of the 3 groups indicated by the peripheral block data in which stored in the data storage section 19 into either the full evaluation group or the partial evaluation group.

The classification section 20 performs this classification based on the peripheral block data of the data storage section 19, and based on the determination result of the determination section 17 or the similarity of the reference pixels contained in the peripheral blocks indicated by the peripheral block data or any combination thereof. Explanation follows regarding a specific example of classification processing by the classification section 20.

Figure 20:
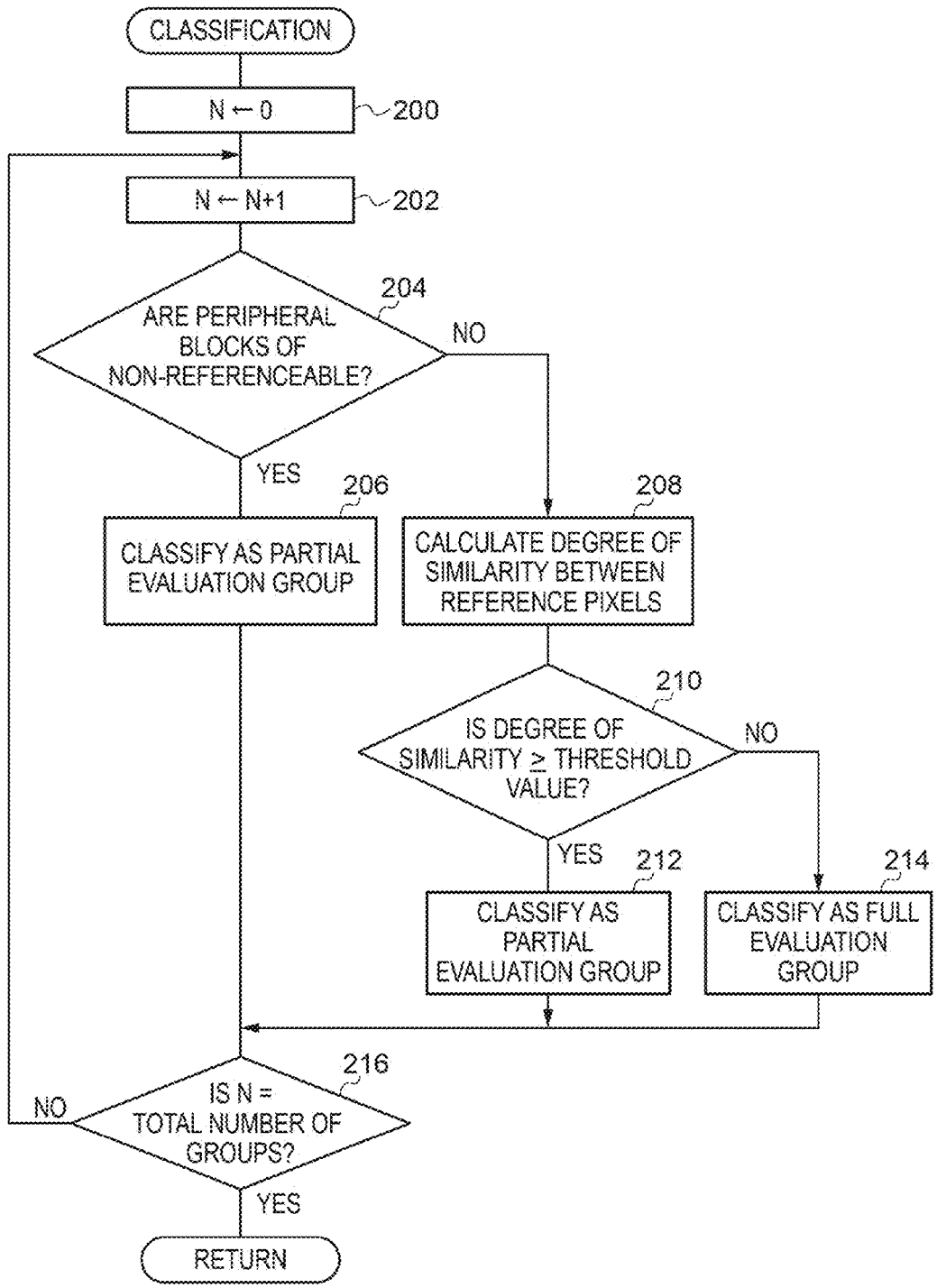
FIG. 20 is a flow chart illustrating an example of classification processing of a classification section.

FIG. 20 is a flow chart indicating an example of classification processing of the classification section 20.

At step 200, the classification section 20 sets a variable number N to 0.

At step 202 the classification section 20 increments the variable number N by 1.

At step 204, the classification section 20 determines whether or not each of the peripheral blocks represented by the peripheral block data of a group N has been determined by the determination section 17 to be non-referenceable, based on the determination result of the determination section 17. For example, determination of step 204 is performed for group 1 when N is 1. In the example illustrated in FIG. 15, the peripheral blocks represented by the peripheral block data of group 1 are the 2 peripheral blocks A, B. The classification section 20 accordingly determines for both the peripheral blocks A, B whether or not they have been determined non-referenceable by the determination section 17.

When affirmative determination is made at step 204 (namely when the each of the peripheral blocks represented by the peripheral block data of the group N are non-referenceable), at step 206 the classification section 20 classifies the group N as being in the partial evaluation group.

Explanation follows regarding the reason classification is made to the partial evaluation group when affirmative determination is made at step 204.

In an intra prediction coding method, in order to select the optimal prediction mode to generate the predicted image of the coding target block from between plural prediction modes, the coding cost for each of the prediction modes is calculated, and the prediction mode with the minimum coding cost is selected. The evaluation value representing the coding cost may, for example, employ a Sum of Absolute Differences (SAD: the absolute sum of the differences between the input image and the predicted image). When the predicted images generated by employing plural prediction modes are the same as each other, the coding cost of each of the plural prediction modes are also then the same as each other. Consequently, for plural prediction modes that have the same predicted image, the coding cost may be computed for a portion of the plural prediction modes (for example for any one thereof).

As described above, each of the pixel values of the reference pixels contained in the peripheral blocks determined to be non-referenceable are either copied from reference pixels of referenceable peripheral blocks, or values generated by Equation (1), and so each of the pixel values are the same. Consequently, for a group in which all the peripheral blocks containing the reference pixels be used for each of the prediction modes belonging to the group are determined to be non-referenceable peripheral blocks, generated predicted images are the same whichever of the prediction modes belonging to the group is employed, enabling the coding cost to also be projected as being the same. Thus a group for which each respective peripheral blocks represented by the peripheral block data is determined to be non-referenceable, is classified as a partial evaluation group.

However, when the classification section 20 makes negative determination at step 204, processing proceeds to step 208 since there is at least 1 referenceable peripheral block represented by the peripheral block data of the group N. At step 208, the classification section 20 computes a degree of similarity between reference pixels contained in the peripheral blocks represented by the peripheral block data of the group N. For example, an inverse of a variance in each of the pixel values of the reference pixels contained in the peripheral blocks represented by the peripheral block data of the group N, or a standard deviation value thereof may be computed as the degree of similarity. This is because the smaller the value is for the variance or standard deviation value, the smaller the difference projected in pixel values between the reference pixels, namely the higher the projected degree of similarity between the reference pixels.

At step 210, the classification section 20 determines whether or not the degree of similarity is a predetermined threshold value or greater. When determined at step 210 that the degree of similarity is higher than the predetermined threshold value, at step 212 the classification section 20 classifies the group N as being a partial evaluation group. When determined at step 210 that the degree of similarity is less than predetermined threshold value, then at step 214 the classification section 20 classifies the group N as a full evaluation group.

Note that although explanation has been given of an example in which the degree of similarity is computed as an inverse of a variance or an inverse of a standard deviation value and is compared with a threshold value, group allocation may be performed by comparing a variance or standard deviation value with a threshold value as it is, without using an inverse thereof. Classification may also be made such that a group with a variance or standard deviation value that is a threshold value or lower is treated as a group with high degree of similarity between reference pixels and classified as a partial evaluation group, and a group with a variance or standard deviation value that is higher than the threshold value is treated as a group with a low degree of similarity between the reference pixels and classified as a full evaluation group.

Explanation follows regarding the reason for classifying a group with high degree of similarity as a partial evaluation group and for classifying a group with low degree of similarity as a full evaluation group.

When plural predicted images are generated by plural prediction modes using reference pixels with a high degree of similarity, the degree of similarity of the plural predicted images generated also becomes higher. Consequently, it is possible to presume that difference in coding cost for each of the prediction modes using the reference pixels of high degree of similarity is small. As long as difference in coding cost of each of the plural prediction modes is small, there will not be a large difference in the image quality and coding efficiency whichever of the prediction modes is selected. Thus in the example illustrated in FIG. 20, groups with high degree of similarity between reference pixels are also classified as partial evaluation groups.

Moreover, when plural predicted images are generated by plural prediction modes using reference pixels with a low degree of similarity, the degree of similarity of the plural predicted images generated also becomes lower. Consequently, it is possible to presume that difference in coding cost between each of the prediction modes that employ reference pixels with a low degree of similarity is large. When difference in coding cost is large, difference in the image quality and coding efficiency is large, too. Thus in the example illustrated in FIG. 20, groups with low degree of similarity between reference pixels are classified as full evaluation groups.

After the processing of each of the steps 206, 212 and 214, the classification section 20 proceeds to step 216 and determines whether or not N is equivalent to the total number of groups. In the example illustrated in FIG. 8 and FIG. 15, since the total number of groups is 3, the classification section 20 makes affirmative determination at step 216 when N=3, and the classification section 20 make negative determination at step 216 when N<3. When negative determination is made at step 216, the classification section 20 returns to step 202, and increments N by 1. Classification is then performed for the next group similarly to the manner described above. When affirmative determination is made at step 216, the classification section 20 ends the classification processing of FIG. 20.

Note that in the above explanation has been given of an example in which plural groups are classified based on the peripheral block data, the determination result of the determination section 17, and the degree of similarity of the reference pixels contained in the peripheral blocks indicated by the peripheral block data, however the classification method is not limited to the method illustrated in FIG. 20.

For example, configuration may be made such that classification of the plural groups is performed based on the peripheral block data and the determination result of the determination section 17 without employing the degree of similarity of the reference pixels.

Figure 21:
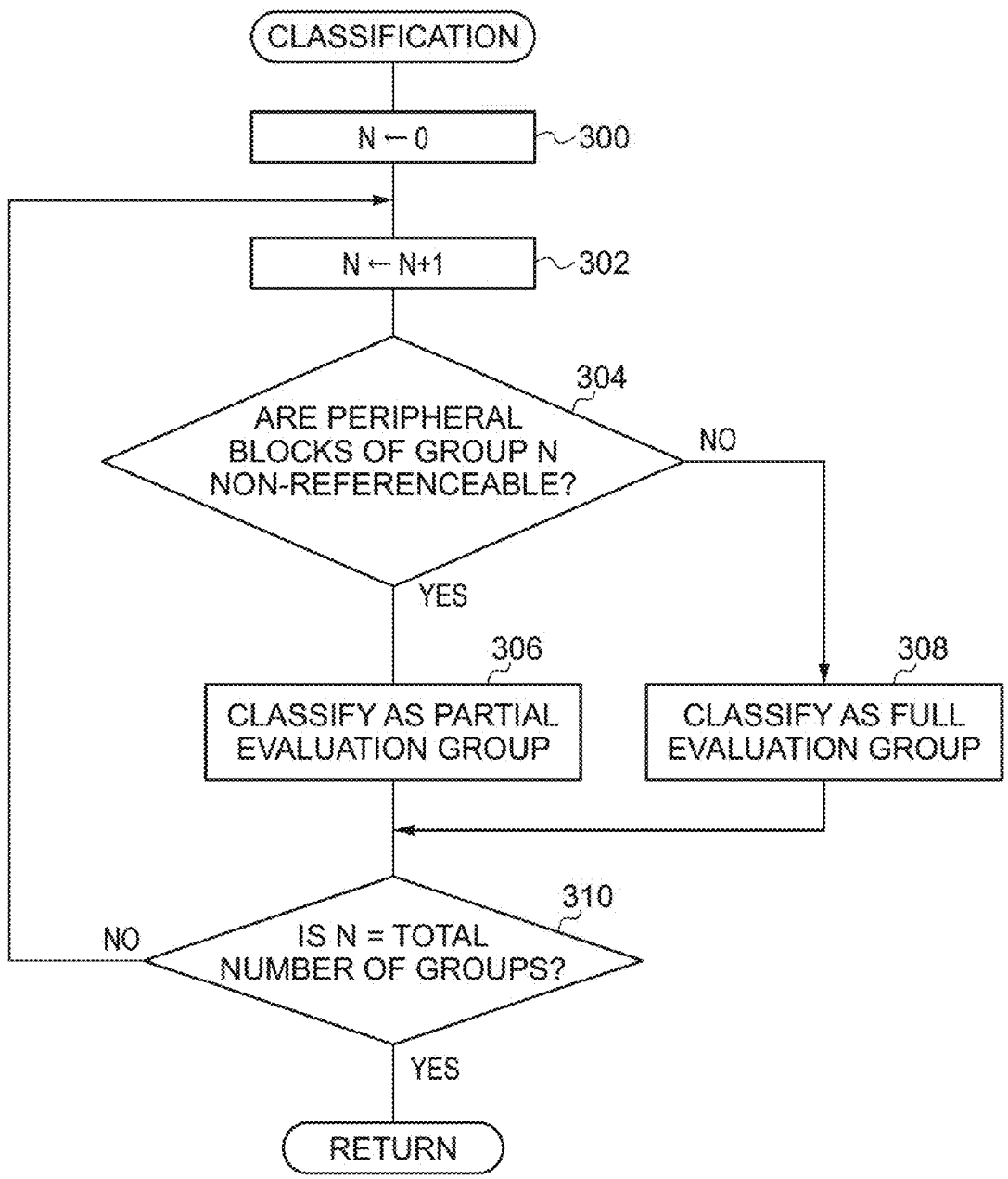
FIG. 21 is a flow chart illustrating another example of classification processing of a classification section.

FIG. 21 is a flow chart of classification processing when plural groups are classified based on the peripheral block data and the determination result of the determination section 17, without employing the degree of similarity of the reference pixels.

The processing of step 300 to step 302 is similar to the processing of step 200 to step 202 of FIG. 20 and so further explanation thereof is omitted.

At step 304, based on the determination result of the determination section 17, the classification section 20 determines whether or not each respective peripheral block represented by the peripheral block data of the group N has been determined to be non-referenceable by the determination section 17.

When affirmative determination is made at step 304, at step 306 the classification section 20 employs similar classification processing to that explained with respect to FIG. 20 to classify the group N as a partial evaluation group.

However, when negative determination is made at step 304, at step 308 the classification section 20 classifies the group N as a full evaluation group.

After the processing of each of the steps 306 and 308, the classification section 20 proceeds to step 310, and determines whether or not N is equivalent to the total number of groups. When negative determination is made at step 310, the classification section 20 returns to step 302 and increments N by 1. The classification section 20 then performs similar classification to that described above for the next group. When affirmative determination is made at step 310, the classification section 20 ends the classification processing illustrated in FIG. 21.

In the classification processing of the example illustrated in FIG. 21, groups that have at least one referenceable peripheral block are not classified as partial evaluation groups, since there is no consideration given to the degree of similarity of the reference pixels. Consequently, there are sometimes cases in which here is a greater number of prediction modes for coding cost evaluation in comparison to performing the classification processing illustrated in FIG. 20. However, since groups having respective peripheral blocks that are each non-referenceable are always classified as being a partial evaluation group, the number for coding cost evaluation is suppressed in comparison to conventional cases.

Moreover, configuration may be made such that, for example, determination is not made of the referenceability of each of the peripheral blocks, and the plural groups are classified based on the peripheral block data, and the degree of similarity between the reference pixels contained in the peripheral blocks represented by the peripheral block data.

Figure 22:
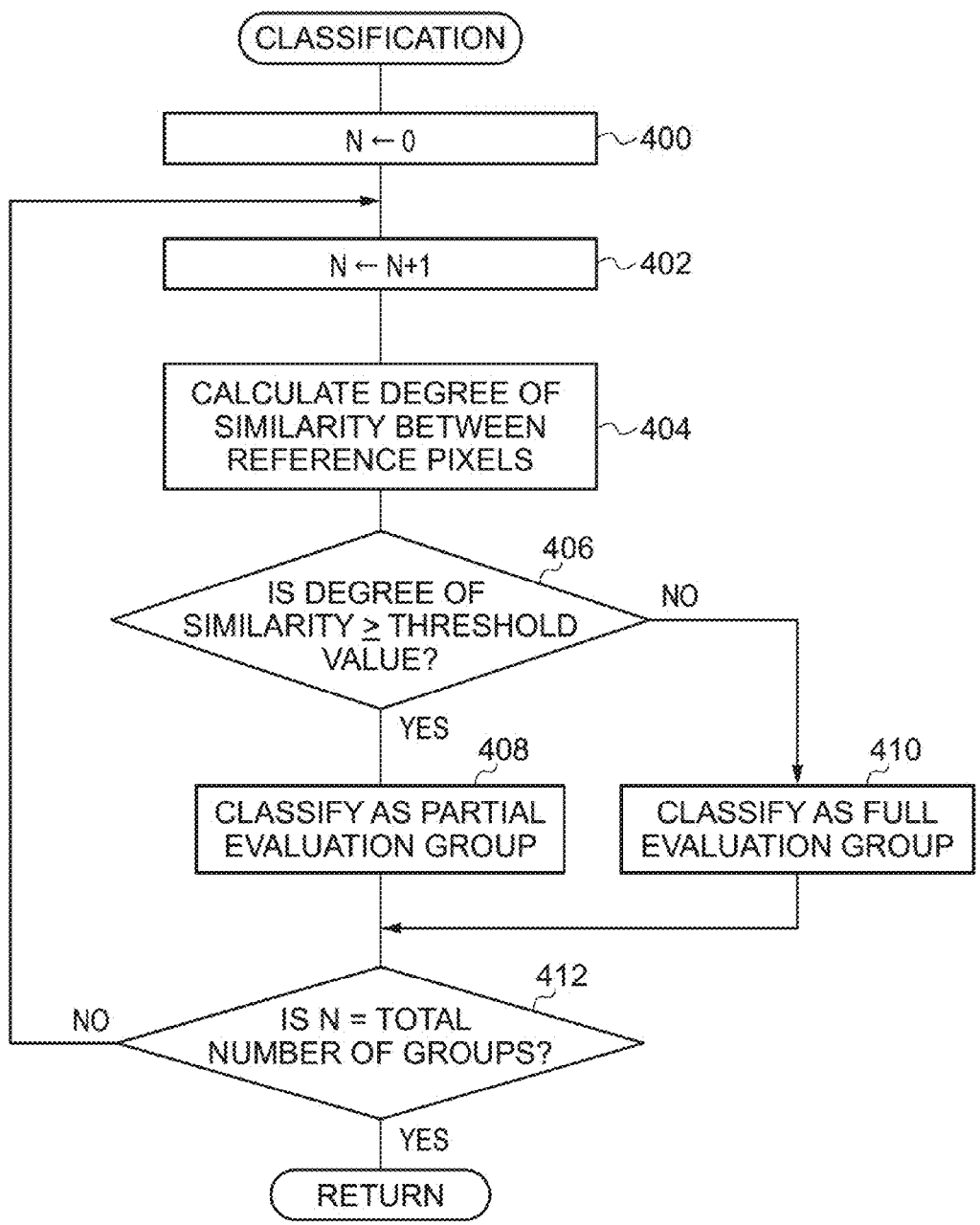
FIG. 22 is a flow chart illustrating another example of classification processing of a classification section.

FIG. 22 illustrates a flow chart of classification processing for a case in which determination is not made of the referenceability of each of the peripheral blocks, and the plural groups are classified based on the peripheral block data, and based on the pixel values of the reference pixels contained in the peripheral blocks represented by the peripheral block data.

The processing of step 400 to step 402 is similar to the processing of step 200 to step 202 of FIG. 20 and so further explanation thereof is omitted.

At step 404, the classification section 20 calculates a degree of similarity between reference pixels included in the peripheral blocks indicated by the peripheral block data of the group N. The calculation of the degree of similarity is performed similarly to the processing of step 208 illustrated in FIG. 20.

At step 406, the classification section 20 determines whether or not the degree of similarity is a predetermined threshold value or greater. When determined at step 406 that the degree of similarity is the predetermined threshold value or greater, at step 408 the classification section 20 classifies the group N as a partial evaluation group. When determined at step 406 that the degree of similarity is less than the predetermined threshold value, at step 410 the classification section 20 classifies the group N as a full evaluation group.

After the processing of each of the steps 408 and 410, the classification section 20 proceeds to step 412 and determines whether or not N is equivalent to the total number of groups. When negative determination is made at step 412 the classification section 20 returns to step 402, increments N by 1, and performs classification similar to that described above for the next group. However when affirmative determination is made at step 412, the classification section 20 ends the classification processing illustrated in FIG. 22.

In the classification processing of the example illustrated in FIG. 22, groups with a degree of similarity between the reference pixels of the peripheral blocks indicated by the peripheral block data of a threshold value or greater are classified as partial evaluation groups. Consequently, groups with the same pixel values of each of the reference pixels of the peripheral blocks are also classified as partial evaluation groups. Since classification is made without using the determination results of the determination section 17, even though there is a marginal drop in the classification efficiency compared to the classification processing of the example illustrated in FIG. 20, the classification result is the same as the result of the classification processing of the example illustrated in FIG. 20.

After the above classification processing has been completed, at step 106 of FIG. 16, the list generation section 21 generates a candidate mode list based on the classification results of the classification section 20.

Figure 23:
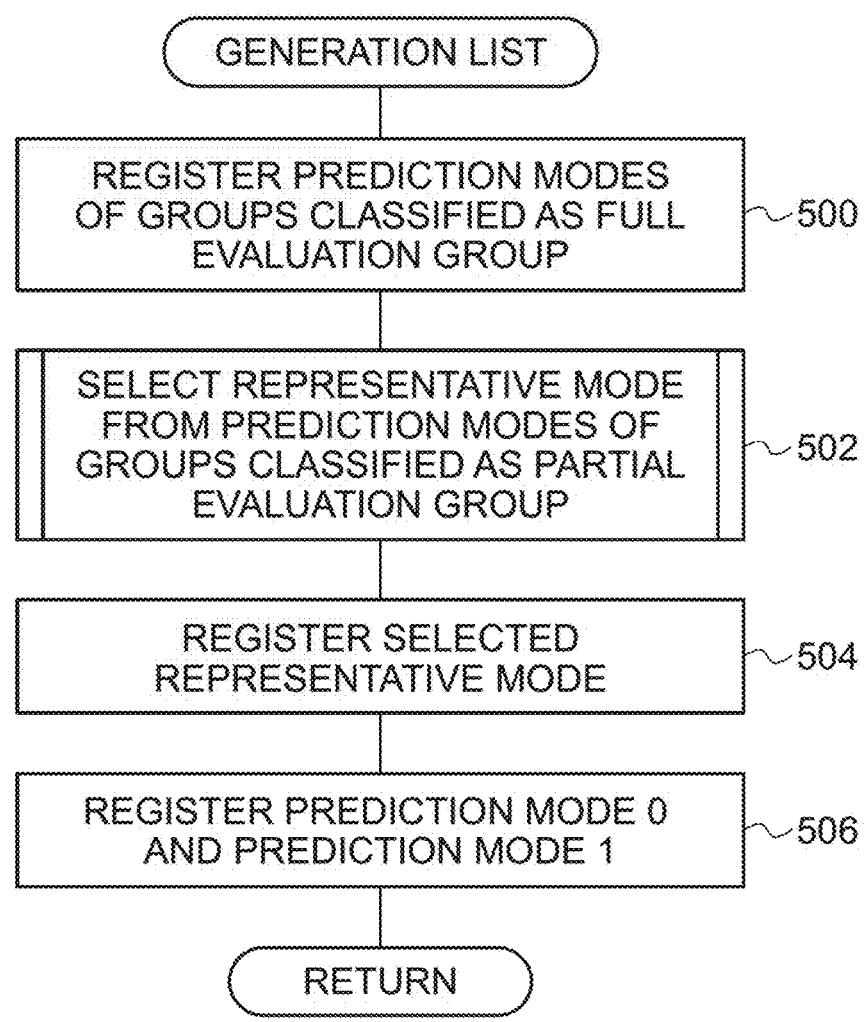
FIG. 23 is a flow chart of an example of a list generation processing is performed by a list generation section.

FIG. 23 is a flow chart illustrating an example of list generation processing by the list generation section 21.

At step 500, the registration section 21a of the list generation section 21 registers all the prediction modes belonging to groups classified as full evaluation groups in a candidate mode list.

At step 502, the selecting section 21b of the list generation section 21 selects a representative mode from out of the prediction modes belonging to the groups classified as partial evaluation groups.

At step 504, the registration section 21a of the list generation section 21 registers the representative mode selected at step 502 in the candidate mode list.

At step 506, the registration section 21a of the list generation section 21 registers the prediction mode 0 (planar prediction) and the prediction mode 1 (DC prediction) in the candidate mode list.

A candidate mode list registered with prediction modes presumed not to be similar (including not the same) in predicted image and coding cost is generated by the processing of steps 500 to 506. The candidate mode list generated by the processing of steps 500 to 506 is output to the determination section 22. Note that the sequence of the processing of step 500, the processing of step 504 and the processing of step 506 is not particularly limited. For example, the prediction modes belonging to the full evaluation group may be registered in the candidate mode list after the representative mode of the partial evaluation group has been registered in the candidate mode list.

Figure 24:
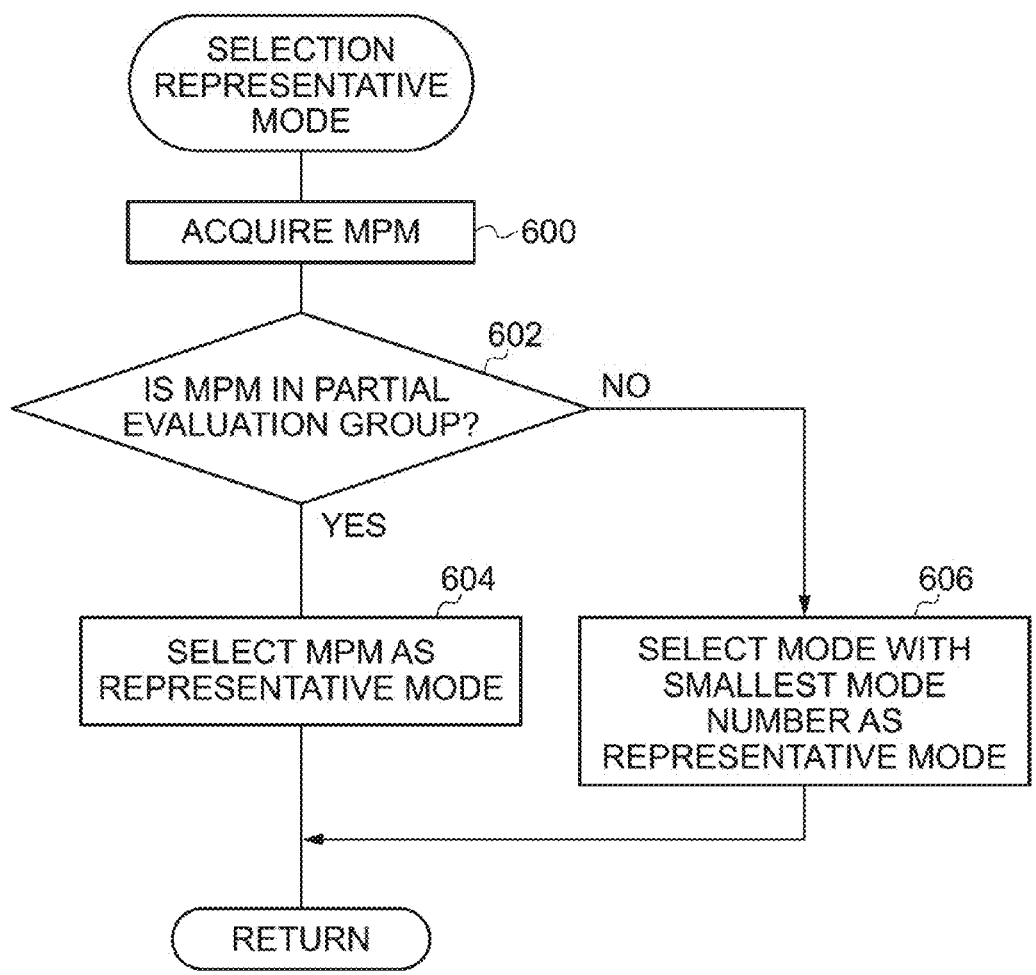
FIG. 24 is a flow chart of an example illustrating representative mode selection processing is performed by a selection section.

FIG. 24 is a flow chart illustrating an example of representative mode selection processing of step 502. In step 600, the selecting section 21*b* acquires a most probable mode (MPM). The MPM is the mode with the smallest number from out of the prediction modes of the block adjacent above the coding target block and the prediction mode of the block adjacent at the left thereof.

In the present exemplary embodiment, in order to perform the video coding of the HEVC method, the MPM is derived by the method determined in the HEVC method. Note that in cases when the prediction mode of the peripheral blocks cannot be acquired, such as when the peripheral blocks adjacent above and to the left are outside of the screen, a prediction mode selected by a method as defined in an HEVC method from one or other out of the prediction mode 0, the prediction mode 1, and of prediction mode 26 is derived as the MPM.

At step 602, the selecting section 21*b* determines whether or not there is a prediction mode the same as the MPM within the prediction modes belonging to the partial evaluation group.

When the selecting section 21*b* determines at step 602 that there is a prediction mode the same as the MPM within the prediction modes belonging to the partial evaluation group, then the MPM is selected at step 604 as the representative mode. Moreover, processing proceeds to step 606 when the selecting section 21*b* determines at step 602 that there is not a prediction mode the same as the MPM within the prediction modes belonging to the partial evaluation group. At step 606, the selecting section 21*b* selects as the representative mode the prediction mode with the smallest mode number from out of the prediction modes belonging to the partial evaluation group.

Note that when there are plural groups classified in the partial evaluation group, groups containing the same block, out of the peripheral blocks indicated by the peripheral block data for each of the groups, are combined as one group, and the processing of FIG. 24 is performed thereon, and a representative mode is selected. For groups not containing the same block, the processing of FIG. 24 is performed for each of the groups, and the representative mode is selected. Two examples are given of classification for cases when all the peripheral blocks are referenceable, and an explanation follows regarding the reasons why the selection method differs.

(1) Cases in which a Group 1 and a Group 2 are Classified into the Partial Evaluation Group.

The reference pixels of each of the peripheral blocks A, B are similar to each other, and the reference pixels of each of the peripheral blocks B to D are similar to each other. The reference pixels of the peripheral blocks A, B have a high degree of similarity, and the reference pixels of each of the peripheral blocks B, C, D have a high degree of similarity, hence it is projected that the degree of similarity of the peripheral blocks A to D is high. Therefore, the predicted images generated are presumed to be similar to each other, and the coding cost is presumed to be close, whichever of the prediction modes included in group 1 or group 2 is employed. Thus the group 1 and the group 2 may be combined into a single group, and one representative mode selected thereof and registered in the candidate mode list.

(2) Cases in which the Group 1 and the Group 3 are Classified in the Partial Evaluation Group.

The reference pixels of each of the peripheral blocks A, B are similar to each other, and the reference pixels of each of the peripheral blocks D, E are similar to each other. However, it is not known whether or not there is a high degree of similarity between each of the reference pixels of the peripheral blocks A, B and each of the reference pixels of the peripheral blocks D, E. Thus since it is not possible to presume that there is a high degree of similarity between the predicted images generated using each of the prediction modes contained in group 1 and group 3, the coding cost cannot be presumed to be close. It is accordingly necessary to select a respective representative mode from each group of group 1 and group 3, and to perform coding cost evaluation on each.

Note that in cases in which the block sizes of the coding target blocks are different from the block sizes when the peripheral blocks have been coded, a representative mode is selected according to the processing illustrated in FIG. 24, similarly to cases in which the block size of the coding target blocks is the same. In the HEVC method, acquiring the prediction mode of the peripheral blocks adjacent above and to the left of the coding target blocks is acquisition irrespective of the size of the peripheral blocks adjacent above and to the left.

The representative mode selected as explained above is registered in the candidate mode list. Explanation has been given of the reason the MPM is registered in the candidate mode list in cases in which there is a prediction mode the same as the MPM within the prediction modes belonging to the partial evaluation group. The entropy coding section 14 not only entropy codes and output streams the quantization signal of the difference image, but also entropy codes and output streams the data representing the prediction mode which was used when the predicted image of the coding target block was generated. In cases in which the MPM is taken as the prediction mode of the coding target block, since the prediction mode of the coding target block and the prediction mode of the peripheral block are the same, the entropy coding section 14 only entropy codes a flag representing information "the same prediction mode as that of the peripheral block". Consequently, the data volume is less during coding in cases in which the MPM is taken as the prediction mode of the coding target block, enabling the coding efficiency to be raised.

The reason the prediction mode with the smallest mode number is registered in the candidate mode list when there is no prediction mode the same as the MPM in the prediction modes belonging to the partial evaluation group, is to give the smallest data volume when entropy coding the number representing the prediction mode.

After the candidate mode list has been generated by the list generation section 21, at step 108 of FIG. 16, the determination section 22 determines the prediction mode when generating the predicted image of the coding target block from out of the prediction modes registered in the candidate mode list.

In order to exhibit the intra prediction performance, preferably the prediction mode with the highest coding efficiency is selected from out of the 35 types of prediction mode. The determination section 22 employs pixel values of the reference pixels input from the reference pixel generation section 18 to compute the coding cost for each of the prediction modes registered in the candidate mode list. Then the determination section 22 compares the computed coding costs, and determines the prediction mode with the smallest coding cost to be the prediction mode when generating the predicted image of the coding target block.

Note that the determination section 22 may compute the previously mentioned SAD as a value representing the coding cost, or may compute the Sum of Squared Differences (SSD), or the Sum of Absolute Transformed Differences (SATD). A value VAL computed according to the following Equation (2) may also be employed as the coding cost.

$$VAL = SAD + c*Bit \qquad \text{Equation (2)}$$

Note that c is a predetermined constant, Bit represents the data volume generated when performing coding of the prediction mode.

At step 110, the predicted image generation section 11 employs the prediction mode determined by the determination section 22 to generate a predicted image of the coding target block from the reference pixels input from the reference pixel generation section 18. The difference image generation section 12 generates a difference image representing the difference between the predicted image generated in the predicted image generation section 11 and the input image, and outputs the difference image to the orthogonal transformation and quantization section 13.

At step 112, the orthogonal transformation and quantization section 13 performs orthogonal transformation processing on the difference image input from the difference image generation section 12. The orthogonal transformation and quantization section 13 then performs quantization of the frequency signal obtained by the orthogonal transformation processing, and outputs a quantization signal to the entropy coding section 14 and the inverse orthogonal transformation and inverse quantization section 15.

At step 114, the entropy coding section 14 entropy codes and output streams the input quantization signal. Data indicating the prediction mode when generating the predicted image of the coding target block is also entropy coded and output streamed.

At step 116, the inverse orthogonal transformation and inverse quantization section 15 inverse quantizes the input quantization signal, then also performs inverse orthogonal transformation processing thereon before outputting a reproduction difference image to the decoded image generation section 16. The decoded image generation section 16 then generates a decoded image of the original coding target block by adding together the predicted image output from the predicted image generation section 11 and the reproduction difference image output from the inverse orthogonal transformation and inverse quantization section 15, and outputs the decoded image to the reference pixel generation section 18.

A more specific explanation next follows regarding an example of operation of the video coding apparatus 10, and in particular of operation from referenceability determination of the peripheral blocks to determining the prediction mode. Note that any of the 3 types of classification processing illustrated in FIG. 20 to FIG. 22 may be employed as the classification processing by the classification section 20, however in each of the following specific examples explanation is given for performing the classification processing illustrated in FIG. 20.

Specific Example 1

As a Specific Example 1, explanation follows regarding coding processing for a case in which all of the 5 peripheral blocks A to E are non-referenceable, following the flow of the flow chart illustrated in FIG. 16. Note that in advance the 33 types of prediction mode are divided into the 3 groups illustrated in FIG. 15, and respective peripheral block data generated and stored.

Figure 25:
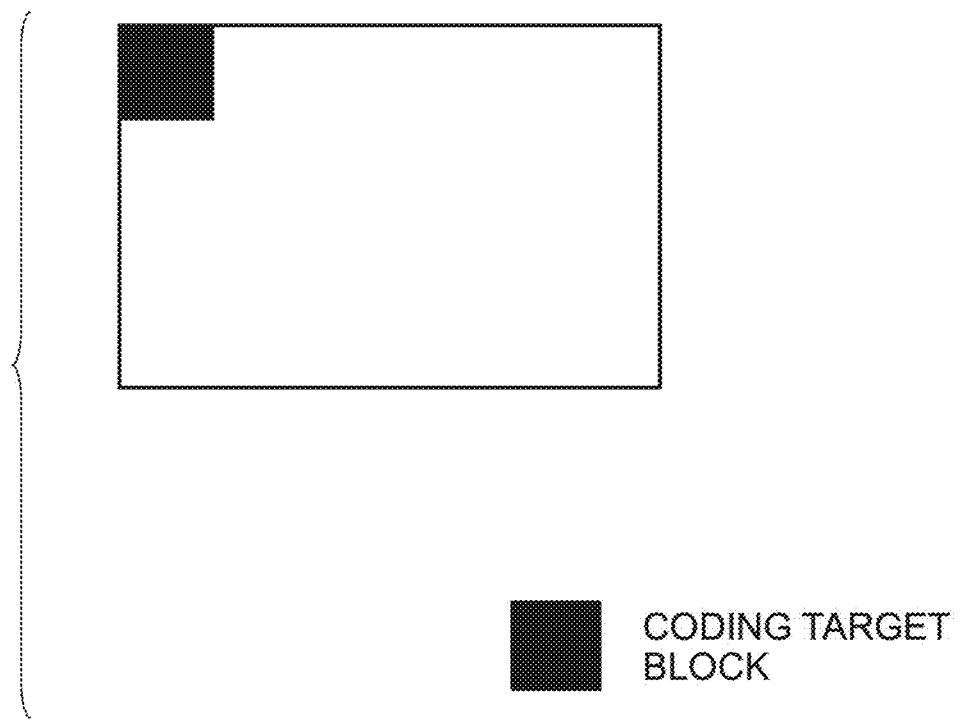
FIG. 25 is a diagram illustrating an example of a coding target block.
Figure 26:
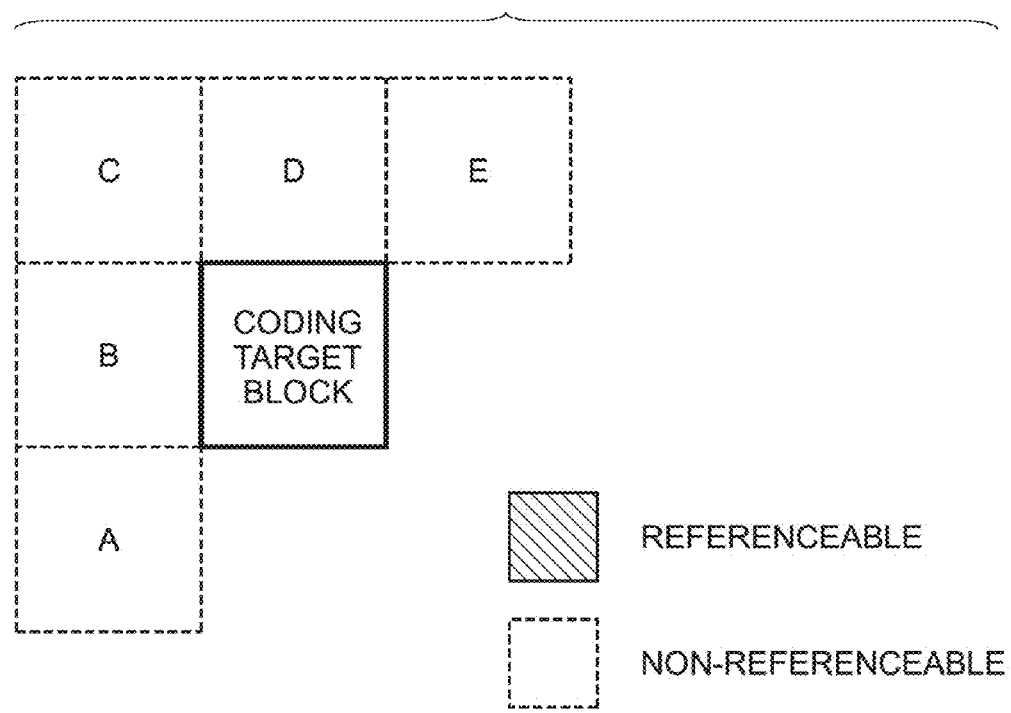
FIG. 26 is a diagram illustrating an example of determination result of whether or not is referenceable for peripheral blocks.

Step 100: Peripheral Block Referenceability Determination for the Coding Target Block
When the coding target block is, as illustrated in FIG. 25, the leading block of the screen (the block positioned at the top left corner portion) then all of the 5 peripheral blocks A to E are positioned outside the screen. Thus according to the HEVC method rules, all of the peripheral blocks are determined to be non-referenceable. FIG. 26 illustrates a referenceability determination result of the Specific Example 1, and the blocks illustrated with broken lines represent non-referenceable peripheral blocks (the same applies in the following FIG. 28 and FIG. 30).

Step 102: Peripheral Block Reference Pixels Generation
In the HEVC method, when all of the 5 peripheral blocks are non-referenceable, the pixel value of all the reference pixels is computed according to Equation (1). The same value is accordingly adopted for pixel values of all the reference pixels.

Step 104: Group Classification
In the Specific Example 1, since all the peripheral blocks A to E of the coding target block are non-referenceable, affirmative determination is made at step 204 of FIG. 20 for all the groups 1 to 3 (step 204: Yes). Each of the groups 1 to 3 is accordingly classified into the partial evaluation group. In the Specific Example 1 there are no groups classified into the full evaluation group.

Step 106: Candidate Mode List Generation
The selection processing illustrated for example in FIG. 24 is employed to select a representative mode from the 33 types of prediction mode belonging to the groups 1 to 3 classified in the partial evaluation group. In such cases, as described above, the MPM is derived according to the determination method of the HEVC method, the derived MPM is selected as the representative mode and registered in the candidate mode list. The prediction mode 0 (flat plane prediction) and the prediction mode 1 (averaging prediction) are also each stored in the candidate mode list.

Step 108: Prediction Mode Determination
The coding cost is evaluated for each of the prediction modes registered in the candidate mode list, and the prediction mode with the smallest difference between the predicted image generated using each of the prediction modes and the input image is determined as the optimal prediction mode.

As explained above, in the Specific Example 1, the number of prediction modes for coding cost evaluation can be reduced from 35 to 3 (MPM, Planar prediction mode, DC prediction mode). This accordingly enables a reduction of 90% or more to be achieved in processing load during prediction mode determination in comparison to conventional cases, without reducing the quality or coding efficiency.

Specific Example 2

As a Specific Example 2, explanation follows regarding a case in which all of the peripheral blocks A to E to the coding target block are referenceable. Note that explanation of the Specific Example 2 also follows the flow of the flow chart illustrated in FIG. 16. Note that in advance the 33 types of prediction mode are divided into the 3 groups illustrated in FIG. 15, and peripheral block data for each is generated and stored.

Figure 27:
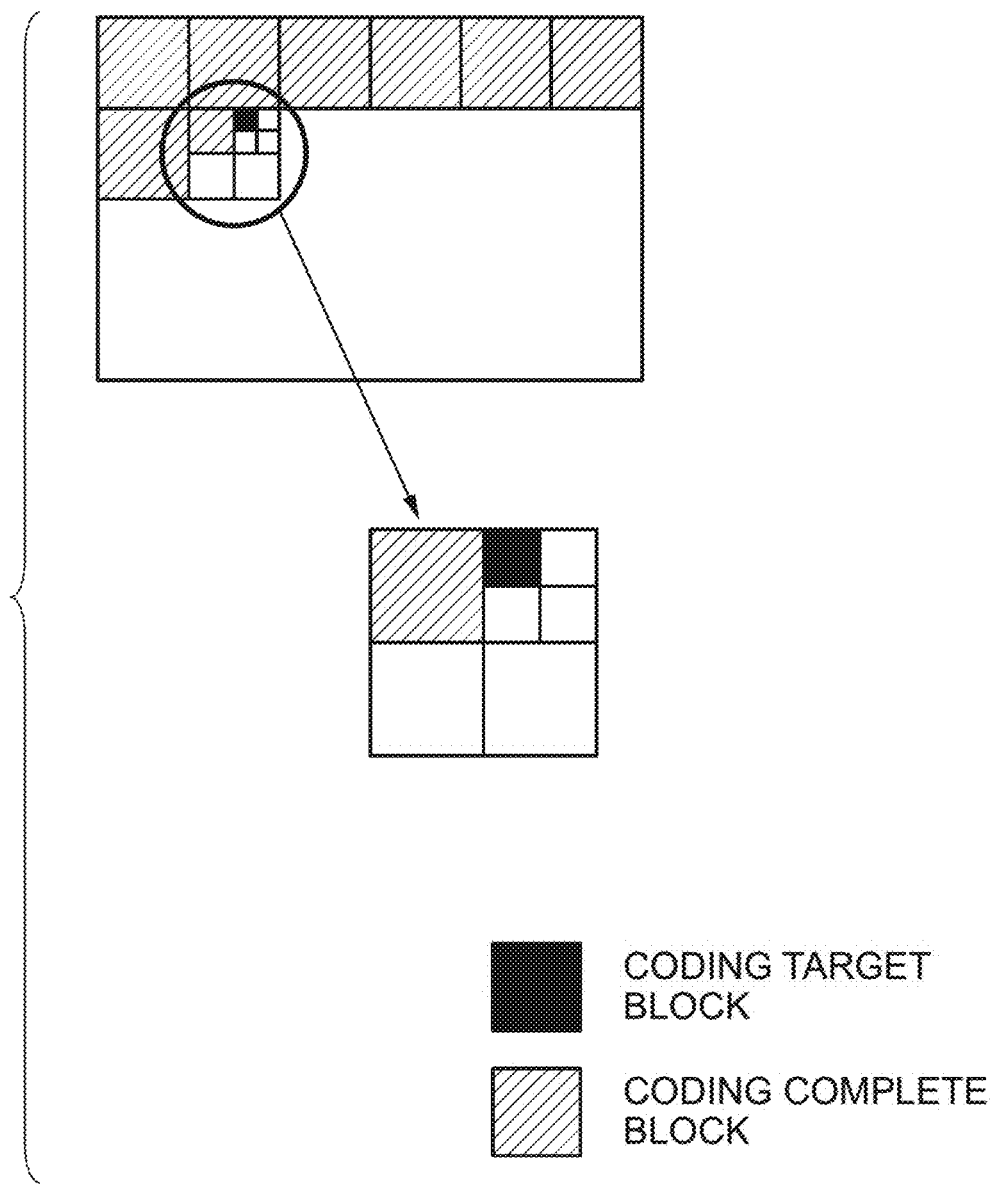
FIG. 27 is a diagram illustrating an example of a coding target block.
Figure 28:
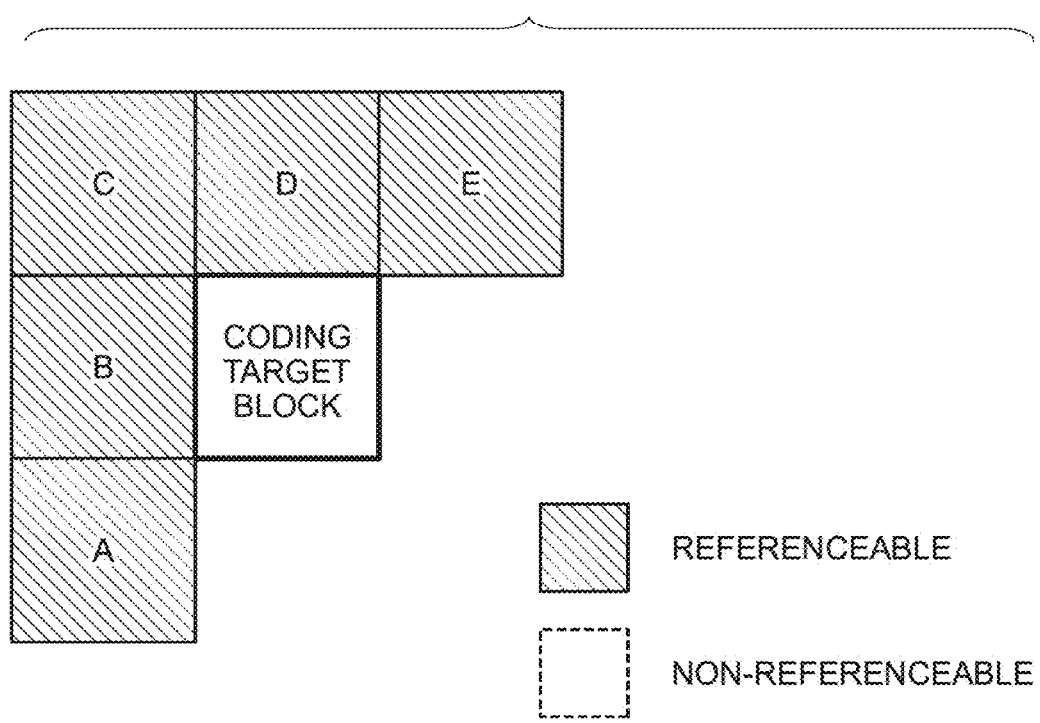
FIG. 28 is a diagram illustrating an example of determination result of whether or not is referenceable for peripheral blocks.

Step 100: Peripheral Block Referenceability Determination for the Coding Target Block In a case in which the size and position of the coding target block is the size and position illustrated in FIG. 27, coding processing has already been completed for all of the 5 peripheral blocks A to E to the coding target block, as illustrated in FIG. 28 (see also FIG. 1 and FIG. 2). The determination section 17 accordingly determines that all of the peripheral blocks A to E are referenceable.

Step 102: Peripheral Block Reference Pixels Generation

In the Specific Example 2, since all of the peripheral blocks A to E are referenceable, there is no need to newly-generate reference pixels, and the pixels of the decoded image generated by the decoded image generation section 16 may be employed. The reference pixel generation section 18 extracts pixels of peripheral blocks to use as the reference pixels from the decoded image input from the decoded image generation section 16, performs smoothing processing thereon, and then outputs the smoothed pixel values to the classification section 20 and the predicted image generation section 11.

Step 104: Group Classification

In the Specific Example 2, since all of the peripheral blocks A to E to the coding target block are referenceable, negative determination is made at step 204 of FIG. 20 for all the groups 1 to 3 (Step 204: No). Thus at step 208 of FIG. 20, the degree of similarity between the reference pixels is calculated for each of the groups, compared at step 210 against a threshold value, and then based on the comparison result classification is made into either the partial evaluation group or the full evaluation group. Groups with degree of similarity of the threshold value or greater (step 210: Yes) are classified into the partial evaluation group (step 212), and groups with a degree of similarity less than the threshold value (step 210: No) are classified into the full evaluation group (step 214).

Step 106: Candidate Mode List Generation

All the prediction modes belonging to the groups classified at step 104 into the full evaluation group are registered in the candidate mode list. A single representative mode is selected from the prediction modes belonging to the groups classified at step 104 into the partial evaluation group, and the representative mode registered in the candidate mode list. The selection method of the representative mode is as illustrated in FIG. 24. The prediction mode 0 (planar prediction) and the prediction mode 1 (DC prediction) are also registered in the candidate mode list.

Step 108: Prediction Mode Determination

The coding cost is evaluated for each of the prediction modes registered in the candidate mode list, and the prediction mode with the smallest difference between the predicted image generated using each of the prediction modes and the input image is determined as the optimal prediction mode.

In the Specific Example 2, the number of prediction modes for which the coding cost is evaluated is the smallest in cases in which all of the groups are classified into the partial evaluation group. Namely, it is possible to reduce the number of prediction modes for coding cost evaluation from 35 to 3 (MPM or the prediction mode with the smallest mode number from out of the partial evaluation group, the planar prediction mode and the DC prediction mode). Moreover, in comparison to conventional cases a reduction in processing load when determining prediction mode is enabled, without reducing quality or coding efficiency even if at least one group, rather than all groups, is classified into the partial evaluation group.

Specific Example 3

As a Specific Example 3, explanation follows regarding a case in which some of the 5 peripheral blocks are non-referenceable. Note that explanation of the Specific Example 3 also follows the flow of the flow chart illustrated in FIG. 16. Note that in advance the 33 types of prediction mode are divided into the 3 groups illustrated in FIG. 15, and peripheral block data for each is generated and stored.

Figure 29:
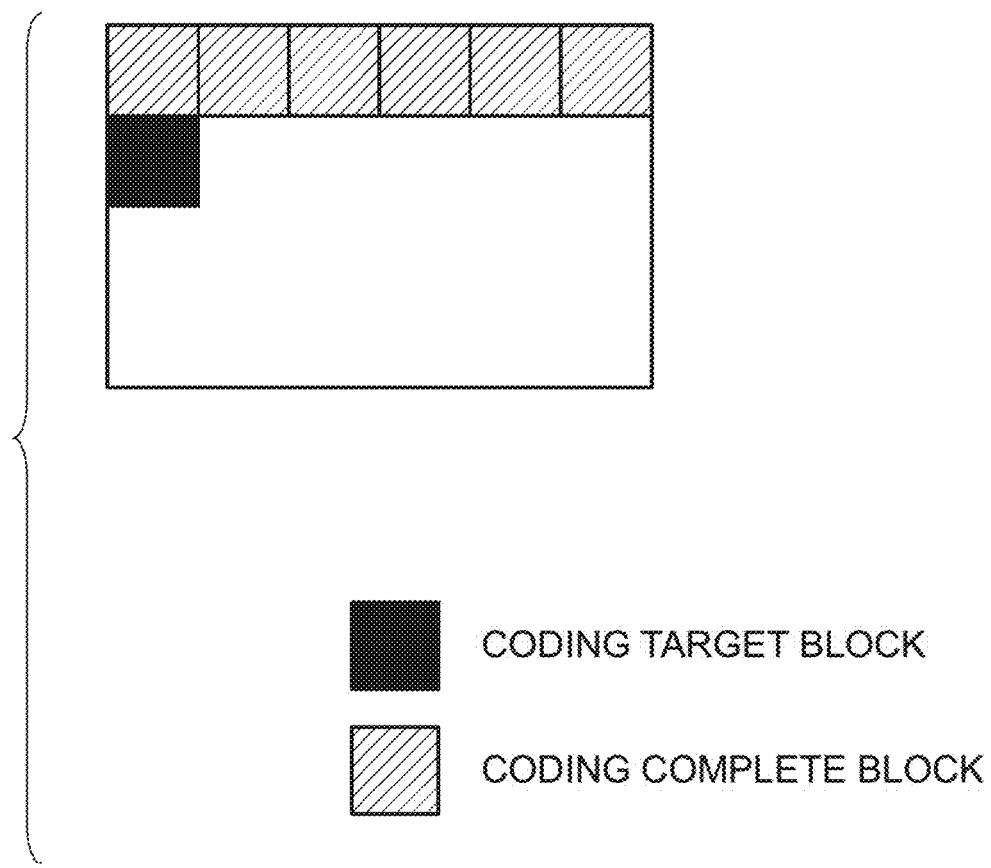
FIG. 29 is a diagram illustrating an example of a coding target block.
Figure 30:
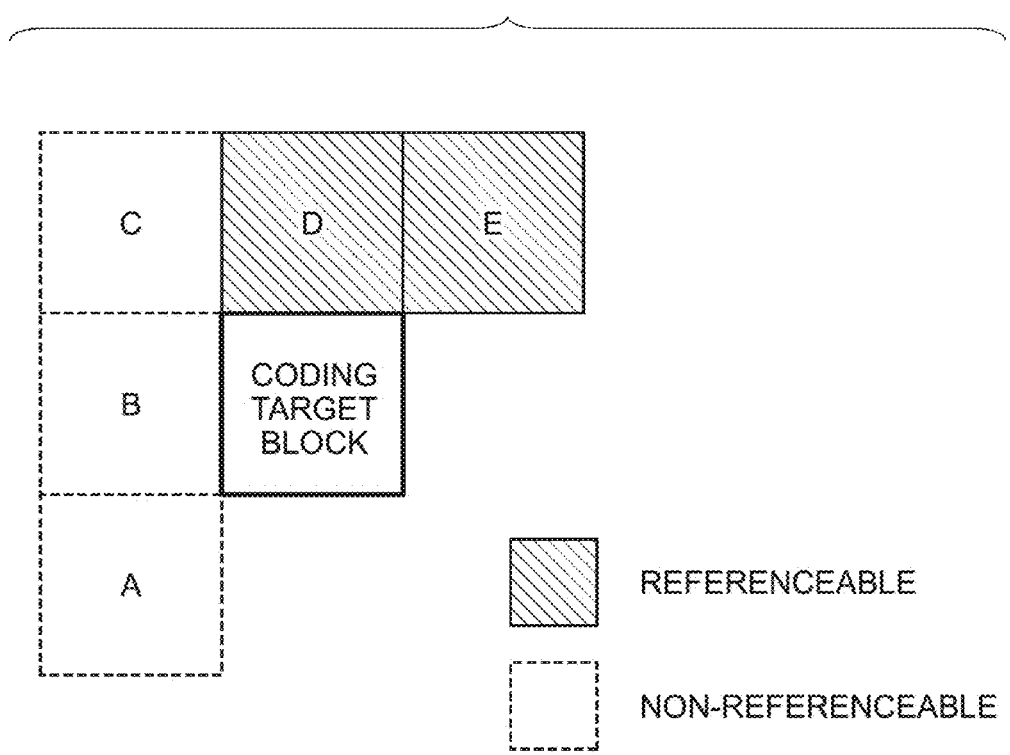
FIG. 30 is a diagram illustrating an example of determination result of whether or not is referenceable for peripheral blocks.

Step 100: Peripheral Block Referenceability Determination for the Coding Target Block In cases in which the size and position of the coding target block is the size and position illustrated in FIG. 29, the peripheral blocks A to C are positioned outside the screen, and coding processing has already been completed for the peripheral blocks D, E, as illustrated in FIG. 30 (see also FIG. 1 and FIG. 2). The peripheral blocks A to C are accordingly determined by the determination section 17 to be non-referenceable, and the peripheral blocks D, E are determined to be referenceable.

Step 102: Peripheral Block Reference Pixels Generation

Figure 31:
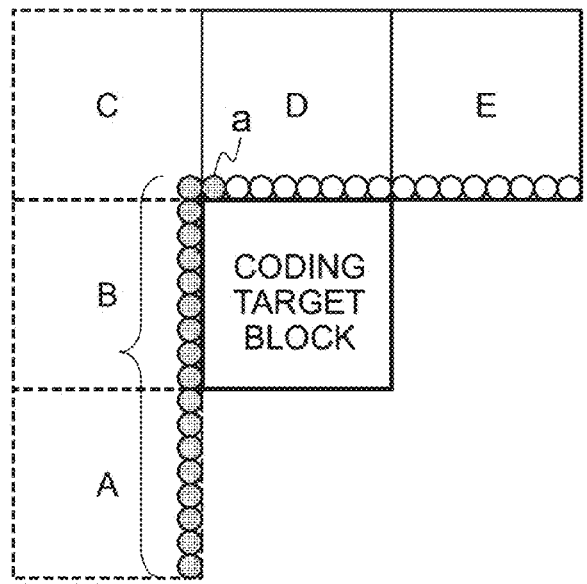
FIG. 31 is an explanatory embodiment illustrating a generation method of pixel values of reference pixels.

Since the peripheral blocks D, E are referenceable, pixels of the decoded image generated by the decoded image generation section 16 can be employed for the reference pixels of the peripheral blocks D, E without newly-generating reference pixels. The pixel values of the reference pixels for the peripheral blocks A to C are, as illustrated in FIG. 31, generated by copying pixel values of a pixel a that is the pixel nearest to the peripheral blocks A to C from out of the reference pixels of the peripheral block D that is nearest to the peripheral blocks A to C.

Step 104: Group Classification

In the Specific Example 3, since the peripheral blocks A to C are non-referenceable, affirmative determination is made at step 204 of FIG. 20 (step 204: Yes) for group 1 for reference to the peripheral block A and B during predicted image generation. Group 1 is accordingly classified into the partial evaluation group. Negative determination is made at step 204 of FIG. 20 for groups 2 and 3 (step 204: No). Thus the degree of similarity between the reference pixels is calculated at step 208 of FIG. 20, compared at step 210 with the threshold value, and according to the comparison results the group 2 and the group 3 are classified into the partial evaluation group or the full evaluation group. Groups with a degree of similarity greater than the threshold value (step 210: Yes) are classified into the partial evaluation group (step 212), and groups with a degree of similarity smaller than the threshold value (step 210: No) are classified into the full evaluation group (step 214).

Step 106: Candidate Mode List Generation

All the prediction modes belonging to the groups classified at step 104 into the full evaluation group are registered in the candidate mode list. Moreover, a single representative mode is selected from the prediction modes belonging to the groups classified at step 104 into the partial evaluation group, and the representative mode is registered in the candidate mode list. The method of selecting the representative mode is according the process illustrated in FIG. 24. The prediction mode 0 (planar prediction) and the prediction mode 1 (DC prediction) are also each registered in the candidate mode list.

Step 108: Prediction Mode Determination

The coding cost for each of the prediction modes registered in the candidate mode list is evaluated, and the prediction mode with the smallest difference between the predicted image generated using each of the prediction modes and the input image is determined as the optimal prediction mode.

In the Specific Example 3, the processing load is reduced compared to conventional cases, since at least the group 1 is classified in the partial evaluation group. Suppose only the group 1 is classified into the partial evaluation group, then the number of coding cost evaluations of the group 1 is reduced from 8 to 1, the number of coding cost evaluations of group 2 and group 3 is unchanged (full evaluation), giving a total of 28 prediction modes for coding cost evaluation. This accordingly enables a 20% reduction in processing load. If however all the groups are classified into the full evaluation group, then similarly to in the Specific Example 1 this enables a reduction of about 90% to be achieved in processing load.

Specific Example 4

As a Specific Example 4, explanation follows regarding a case in which some of the 5 peripheral blocks are non-referenceable. Note that explanation of the Specific Example 4 also follows the flow of the flow chart illustrated in FIG. 16. Note that in advance the 33 types of prediction mode are divided into the 3 groups illustrated in FIG. 15, and peripheral block data for each is generated and stored.

Step 100: Peripheral Block Referenceability Determination for the Coding Target Block In cases in which the size and position of the coding target block is the size and position illustrated in FIG. 17, the peripheral blocks C to E are positioned outside the screen, the coding of the peripheral block A has not yet been performed, and coding processing has been completed only for the peripheral block B, as illustrated in FIG. 18. The peripheral blocks A and C to E are accordingly determined by the determination section 17 to be non-referenceable, and the peripheral block B is determined to be referenceable.

Step 102: Peripheral Block Reference Pixels Generation

Since the peripheral block B is referenceable, the pixels of the decoded image generated by the decoded image generation section 16 can be employed for the reference pixels of the peripheral block B without newly-generating reference pixels. The pixel values of the reference pixels for the peripheral block A are, as illustrated in FIG. 19, generated by copying the pixel value of a pixel b that is the pixel nearest to the peripheral block A from out of the reference pixels of peripheral block B. The pixel values of the reference pixels of the peripheral blocks C to E are, as illustrated in FIG. 19, generated by copying the pixel value of a pixel a that is the pixel nearest to the peripheral blocks C to E from out of the reference pixels of peripheral block B.

Step 104: Group Classification

In the Specific Example 4, since only the peripheral block B is referenceable, affirmative determination is made at step 204 of FIG. 20 (step 204: Yes) for group 3. Group 3 is accordingly classified into the partial evaluation group. Negative determination is made at step 204 of FIG. 20 for groups 1 and 2 (step 204: No). Next the degree of similarity between the reference pixels is calculated at step 208 of FIG. 20, compared at step 210 with the threshold value, and the group 1 and the group 2 are classified into the partial evaluation group or the full evaluation group according to the comparison results. Groups with degree of similarity of the threshold value or greater (step 210: Yes) are classified into the partial evaluation group (step 212), and groups with a degree of similarity smaller than the threshold value (step 210: No) are classified into the full evaluation group (step 214).

Step 106: Candidate Mode List Generation

All the prediction modes belonging to the groups classified at step 104 to the full evaluation group are registered in the candidate mode list. Moreover, a single representative mode is selected from the prediction modes belonging to the groups classified at step 104 into the partial evaluation group, and the representative mode is registered in the candidate mode list. The method of selecting the representative mode is according the process illustrated in FIG. 24. The prediction mode 0 (planar prediction) and the prediction mode 1 (DC prediction) are also each registered in the candidate mode list.

Step 108: Prediction Mode Determination

The coding cost for each of the prediction modes recoded in the candidate mode list is evaluated, and the prediction mode with the smallest difference between the predicted image generated using each of the prediction modes and the input image is determined as the optimal prediction mode.

In the Specific Example 4, a reduction in processing load compared to conventional cases is enabled since at least group 3 is classified into the partial evaluation group. Suppose that only the group 3 is classified in the partial evaluation group, then the number of coding cost evaluations of the group 3 is reduced from 8 to 1, the number of coding cost evaluations of group 1 and group 2 is unchanged (full evaluation), giving a total of 28 prediction modes for coding cost evaluation. This accordingly enables a 20% reduction in processing load. If however all the groups are classified into the full evaluation group, then similarly to in the Specific Example 1 this enables a reduction of about 90% to be achieved in processing load.

As explained above, the present exemplary embodiment enables coding cost evaluation to be omitted for prediction modes that are presumed to have the same, or similar, coding cost, enabling a reduction to be achieved in the number of prediction modes for coding cost evaluation while suppressing reduction in quality and coding efficiency.

In particular, in the HEVC method, the coding target blocks may have plural block sizes. In a conventional method, in order to select the block size to achieve the optimum coding efficiency, coding cost evaluation is required for all of the prediction modes for each of the block sizes, with this taking a significant amount of time. However, the above exemplary embodiment enables a reduction to be made in the prediction modes for coding cost evaluation without reducing quality and coding efficiency, enabling the overall time required for coding processing to be shortened.

Moreover, when selecting the representative mode, since the MPM or the prediction mode with the smallest mode number is selected, the data volume generated to code the prediction mode is reduced, enabling the coding efficiency to be raised.

Note that a video coding apparatus is not limited to the configuration illustrated in FIG. 6. For example, as described above, when a function for generating peripheral block data is configured within the video coding apparatus, a configuration of video coding apparatus may be adopted such as that illustrated in FIG. 32.

Figure 32:
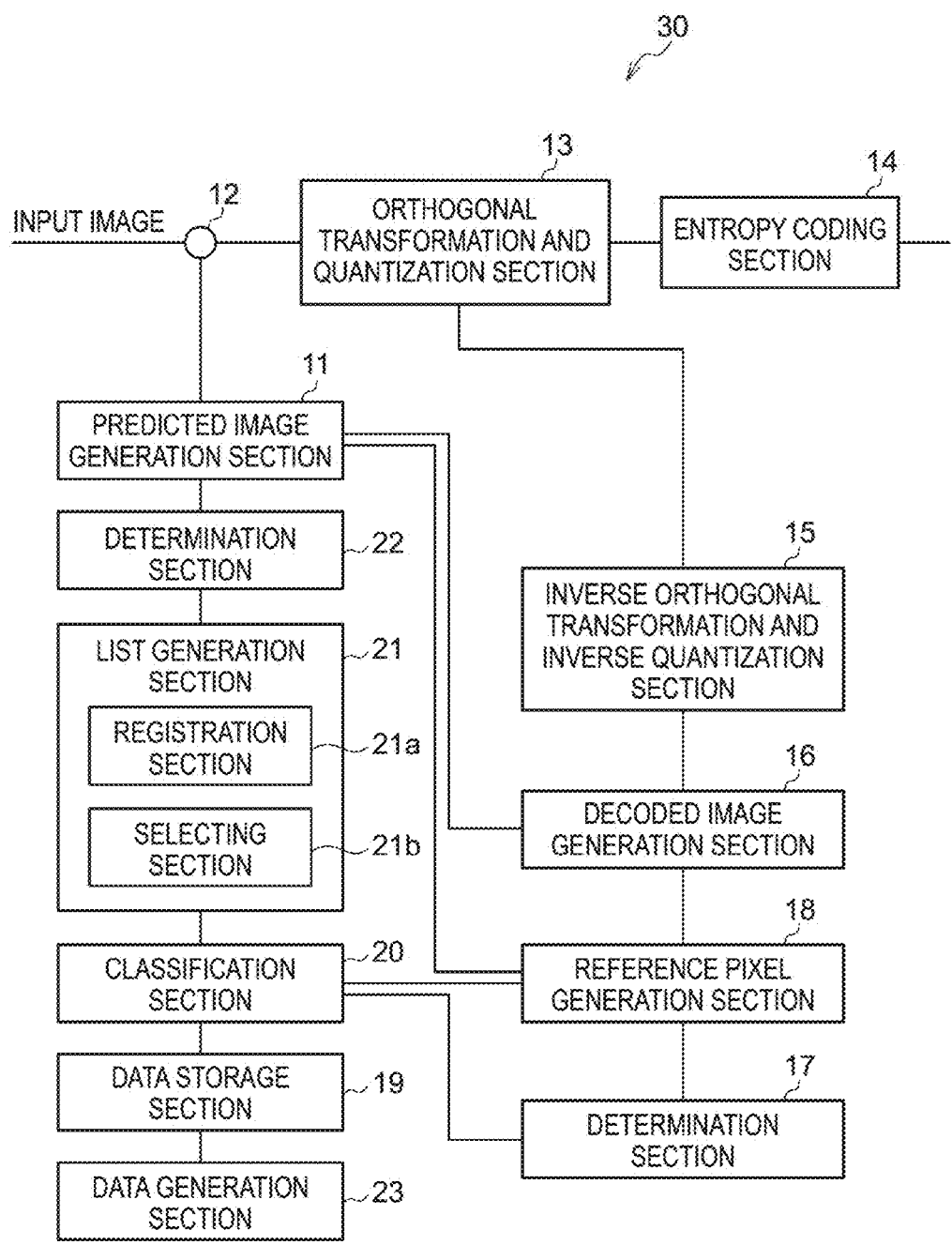
FIG. 32 is a configuration diagram illustrating another configuration of a video coding apparatus.

In a video coding apparatus 30 illustrated in FIG. 32, a data generation section 23 is provided in addition to each of the configuration elements of the video coding apparatus 10 illustrated in FIG. 6.

Prior to performing video coding, the data generation section 23 classifies into the same group prediction modes with the same peripheral blocks for reference during predicted image generation, generates peripheral block data for each of the groups and stores the peripheral block data in the data storage section 19. Specific examples of group division methods and peripheral block data are as explained in the above exemplary embodiments, and so further explanation thereof is omitted. Note that a data generation process is added to the coding program 50 of the first storage section 45 of the computer 40 in cases in which the data generation section 23 is provided to a video coding apparatus.

Explanation has been given in the above exemplary embodiments of examples in which plural prediction modes are classified in advance such that prediction modes with the same peripheral blocks for reference are classified in the same group (advanced classification), and each of the groups is then classified by the determination section 17 into either the partial evaluation group or the full evaluation group. However, the advanced classification is not limited to the method explained in the above exemplary embodiment.

For example, configuration may be made such that the above group 2 is further divided into plural groups. Similarly, processing may be performed such that the other groups 1, 3 are also further divided into plural groups. Although this increases the number of groups, similar results and advantageous effects are obtained to those of the above exemplary embodiments.

Moreover, configuration may be made such that prediction groups which do not have completely the same peripheral blocks for reference but have similar prediction directions are classified into the same group. For example, the prediction modes 2 to 34 may be classified into 2 groups instead of 3 groups. More specifically, for example, plural prediction modes may be classified by the advanced classification into a group G1 of the prediction modes 2 to 17 and a group G2 of the prediction modes 18 to 34. In cases in which the 33 types of prediction mode are divided into the 2 groups G1, G2, even though the peripheral blocks for reference are not completely the same for each of the prediction modes belonging to the same group, the classification processing by the determination section 17 may still be applied similarly to in the above exemplary embodiments. In cases in which the 33 types of prediction mode are divided into 2 groups, when there are no groups classified into the partial evaluation group, then the advanced classification may be redone, and the classification processing of the determination section 17 executed again.

Explanation has been given in the above exemplary embodiments of an example in which a single representative mode is selected from the prediction modes belonging to the partial evaluation group, and registered in the candidate mode list, however there is no limitation to selecting a single prediction mode. For the partial evaluation group, as long as some, not all, of the prediction modes belonging to the partial evaluation group are evaluated, plural of the prediction modes may be selected as representative modes. For example, the MPM, and the mode with the smallest mode number out of the prediction modes may both be selected as representative modes, and both of these registered in the candidate mode list.

Note that although explanation has been given above of a mode in which a coding program is stored on the first storage section 45, it is possible to provide the coding program recorded on a portable recording medium such as a CD-ROM, or USB connectable flash memory.

The intra prediction coding method of technology disclosed herein is not limited to a HEVC method, and another method may be employed therefor.

Note that although explanation has been given in the present exemplary embodiments of examples in which each of the functional sections of the video coding apparatus is implemented by a computer 40 executing the coding program 50, the functional sections may be implemented for example by electronic circuits. For example, each of the functional section of the video coding apparatus may, for example, be implemented by a semiconductor integrated circuit, or more specifically by an Application Specific Integrated Circuit (ASIC).

All publications, patent applications, and technical standards mentioned in this specification are herein incorporated by reference to the same extent as if such individual publication, patent application, or technical standard was specifically and individually indicated to be incorporated by reference.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. A video coding apparatus comprising:
a processor; and
a memory storing instructions, which when executed by the processor perform a procedure, the procedure including:
(a) determining whether or not a peripheral block of a coding target block, which is an object of coding using an intra prediction coding method, is referenceable when generating a predicted image of the coding target block;
(b) generating a pixel value of a reference pixel included in a peripheral block determined at (a) to be non-referenceable, based on the determination result of (a) and a pixel value of a reference pixel included in a peripheral block determined at (a) to be referenceable;
(c) for each of a plurality of groups arising when a plurality of prediction modes are classified in the plurality of groups such that prediction modes with similar prediction directions are classified into the same group,
classifying each of the plurality of groups into either a full evaluation group in which coding costs are evaluated for all prediction modes or a partial evaluation group in which coding costs are evaluated for a part of the prediction modes,
based on peripheral block data that represents peripheral blocks containing each of the reference pixels employed when generating the predicted image using one or more prediction modes belonging to individual groups, and the determination result of (a) or a degree of similarity between reference pixels contained in peripheral blocks represented by the peripheral block data or any combination thereof;

(d) determining the prediction mode to use as generating the predicted image of the coding target block by evaluating coding costs of all the prediction modes belonging to each of the groups for a group classified at (c) in the full evaluation group, and evaluating coding costs of a portion of prediction modes out of the prediction modes belonging to each of the groups for a group classified at (c) in the partial evaluation group; and (e) generating a predicted image of the coding target block using the prediction mode determined at (d).

2. The video coding apparatus of claim 1, wherein:
(c) includes classifying, in the partial evaluation group, a group for which each of the peripheral blocks represented by the peripheral block data is determined to be non-referenceable based on the determination result of (a).

3. The video coding apparatus of claim 1, wherein:
(c) includes, for a group for which at least one peripheral block represented by the peripheral block data is determined to be referenceable based on the determination result of (a), based on a degree of similarity between reference pixels contained in peripheral blocks represented by the peripheral block data, classifying a group with a degree of similarity greater than a threshold value in the partial evaluation group, and classifying a group with a degree of similarity less than the threshold value in the full evaluation group.

4. The video coding apparatus of claim 1, wherein:
(c) includes, based on a degree of similarity between reference pixels contained in peripheral blocks represented by the peripheral block data, classifying a group with a degree of similarity greater than a threshold value in the partial evaluation group, and classifying a group with a degree of similarity less than the threshold value in the full evaluation group.

5. The video coding apparatus of claim 1, wherein:
prediction modes having similar directions for the prediction direction are prediction modes having the same peripheral blocks containing reference pixels employed when generating the predicted image of the coding target block.

6. The video coding apparatus of claim 1, wherein the procedure further includes:
(f), from the prediction modes belonging to a group classified at (c) in the partial evaluation group, selecting a prediction mode to evaluate coding costs based on a prediction mode for which a peripheral block of the coding target block is employed and based on an identification number that identifies a prediction mode belonging to the group; and wherein (d) includes evaluating the coding cost of the prediction mode selected at (f) for a group classified at (c) in the partial evaluation group.

7. A video coding method comprising:
(a) by a processor, determining whether or not the peripheral blocks of a coding target block, which is an object of coding using an intra prediction coding method, are referenceable when generating a predicted image of the coding target block;

(b) by the processor, generating pixel values of reference pixels included in peripheral blocks determined at (a) to be non-referenceable, based on a determination result of (a) and based on pixel values of a reference pixels included in a peripheral block determined at (a) to be referenceable;

(c) by the processor, for each of a plurality of groups arising when a plurality of prediction modes are classified in the plurality of groups such that prediction modes with similar prediction directions are classified into the same group, classifying each of the plurality of groups into either a full evaluation group in which coding costs are evaluated for all prediction modes or a partial evaluation group in which coding costs are evaluated for a part of the prediction modes, based on peripheral block data that represents peripheral blocks containing each of the reference pixels employed when generating the predicted image using one or more prediction modes belonging to individual groups, and the determination result of (a) or a degree of similarity between reference pixels contained in peripheral blocks represented by the peripheral block data or any combination thereof;

(d) by the processor, determining the prediction mode for use when generating the predicted image of the coding target block by evaluating coding costs of all the prediction modes belonging to each of the groups for a group classified at (c) in the full evaluation group, and evaluating coding costs of a portion of prediction modes out of the prediction modes belonging to each of the groups for a group classified at (c) in the partial evaluation group; and (e) by the processor, generating a predicted image of the coding target block using the prediction mode determined at (d).

8. The video coding method of claim 7, wherein:
(c) includes, when classifying, classifying in the partial evaluation group, a group for which each of the peripheral blocks represented by the peripheral block data is determined to be non-referenceable based on the determination result of (a).

9. The video coding method of claim 7, wherein:
(c) includes, when classifying, for a group for which at least one peripheral block represented by the peripheral block data is determined to be referenceable based on the determination result of (a), based on a degree of similarity between reference pixels contained in peripheral blocks represented by the peripheral block data, classifying a group with a degree of similarity greater than a threshold value in the partial evaluation group, and classifying a group with a degree of similarity less than the threshold value in the full evaluation group.

10. The video coding method of claim 7, wherein:
(c) includes, when classifying, based on a degree of similarity between reference pixels contained in peripheral blocks represented by the peripheral block data, classifying a group with a degree of similarity greater than a threshold value in the partial evaluation group, and classifying a group with a degree of similarity less than the threshold value in the full evaluation group.

11. The video coding method of claim 7, wherein:
prediction modes having similar directions for the prediction direction are prediction modes having the same peripheral blocks containing reference pixels employed when generating the predicted image of the coding target block.

12. The video coding method of claim 7, further including:
- (f) by the processor, from the prediction modes belonging to a group classified at (c) in the partial evaluation group selecting a prediction mode to evaluate coding costs based on a prediction mode for which a peripheral block of the coding target block is employed and based on an identification number that identifies a prediction mode belonging to the group; and
- wherein (d) includes evaluating the coding cost of the prediction mode selected at (f) for a group classified at (c) in the partial evaluation group.

13. A non-transitory computer-readable recording medium having stored therein a program for causing a computer to execute a video coding process, the process comprising:
- (a) determining whether or not a peripheral block of a coding target block, which is an object of coding using an intra prediction coding method, is referenceable when generating a predicted image of the coding target block;
- (b) generating pixel values of reference pixels included in peripheral blocks determined at (a) to be non-referenceable, based on a determination result of (a) and a pixel value of a reference pixel included in a peripheral block determined at (a) to be referenceable;
- (c) for each of a plurality of groups arising when a plurality of prediction modes are classified in the plurality of groups such that prediction modes with similar prediction directions are classified into the same group,
  - classifying each of the plurality of groups into either a full evaluation group in which a coding cost is evaluated for all prediction modes or a partial evaluation group in which coding costs are evaluated for a part of the prediction modes,
  - based on peripheral block data that represents peripheral blocks containing each of the reference pixels employed when generating the predicted image using one or more prediction modes belonging to individual groups, and
  - the determination result of (a) or a degree of similarity between reference pixels contained in peripheral blocks represented by the peripheral block data or any combination thereof;
- (d) determining the prediction mode for use when generating the predicted image of the coding target block by evaluating a coding cost of all the prediction modes belonging to each of the groups for a group classified at (c) in the full evaluation group,
- and evaluating coding costs of a portion of prediction modes out of the prediction modes belonging to each of the groups for a group classified at (c) in the partial evaluation group; and
- (e) generating a predicted image of the coding target block using the prediction mode determined at (d).

14. The non-transitory computer-readable recording medium of claim 13, wherein:
- (c) includes, when classifying, classifying, in the partial evaluation group, a group for which each of the peripheral blocks represented by the peripheral block data is determined to be non-referenceable based on the determination result of (a).

15. The non-transitory computer-readable recording medium of claim 13, wherein:
- (c) includes, when classifying, for a group for which at least one peripheral block represented by the peripheral block data is determined to be referenceable based on the determination result of (a), based on a degree of similarity between reference pixels contained in peripheral blocks represented by the peripheral block data, classifying a group with a degree of similarity greater than a threshold value in the partial evaluation group, and classifying a group with a degree of similarity of less than the threshold value in the full evaluation group.

16. The non-transitory computer-readable recording medium of claim 13, wherein:
- (c) includes, when classifying, based on a degree of similarity between reference pixels contained in peripheral blocks represented by the peripheral block data, classifying a group with a degree of similarity greater than a threshold value in the partial evaluation group, and classifying a group with a degree of similarity less than the threshold value in the full evaluation group.

17. The non-transitory computer-readable recording medium of claim 13, wherein:
- prediction modes having similar directions for the prediction direction are prediction modes having the same peripheral blocks containing reference pixels employed when generating the predicted image of the coding target block.

18. The non-transitory computer-readable recording medium of claim 13, wherein the video coding process further comprises:
- (f), from the prediction modes belonging to a group classified at (c) in the partial evaluation group, selecting a prediction mode to evaluate coding costs based on a prediction mode for which a peripheral block of the coding target block is employed and based on an identification number that identifies a prediction mode belonging to the group; and
- wherein (d) includes evaluating the coding cost of the prediction mode selected at (f) for a group classified at (c) in the partial evaluation group.

* * * * *